United States Patent
Brushett et al.

(10) Patent No.: US 12,218,316 B2
(45) Date of Patent: Feb. 4, 2025

(54) CONVECTION-ENHANCED ELECTROCHEMICAL ENERGY STORAGE DEVICES AND RELATED METHODS

(71) Applicant: Massachusetts Institute of Technology, Cambridge, MA (US)

(72) Inventors: Fikile Richard Brushett, Cambridge, MA (US); Weiran Gao, Boston, MA (US); Javit Drake, Jamaica Plain, MA (US); Michael Orella, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 78 days.

(21) Appl. No.: 17/504,909

(22) Filed: Oct. 19, 2021

(65) Prior Publication Data

US 2022/0123377 A1 Apr. 21, 2022

Related U.S. Application Data

(60) Provisional application No. 63/093,740, filed on Oct. 19, 2020.

(51) Int. Cl.
*H01M 10/00* (2006.01)
*H01M 10/0563* (2010.01)
(Continued)

(52) U.S. Cl.
CPC ... *H01M 10/4214* (2013.01); *H01M 10/0563* (2013.01); *H01M 2004/027* (2013.01);
(Continued)

(58) Field of Classification Search
CPC ......... H01M 10/4214; H01M 10/0563; H01M 4/133; H01M 4/134; H01M 4/505;
(Continued)

(56) References Cited

U.S. PATENT DOCUMENTS 8,124,296 B1 2/2012 Fischel
8,158,277 B1 4/2012 Fischel
(Continued)

OTHER PUBLICATIONS

Wikipedia [electromigration] (Year: 2023).*
(Continued)

*Primary Examiner* — Anca Eoff
*Assistant Examiner* — Monique M Wills
(74) *Attorney, Agent, or Firm* — Wolf, Greenfield & Sacks, P.C.

(57) ABSTRACT

A convection enhanced energy storage system includes an electrochemical cell with a positive electrode, a separator, and a negative electrode, a tank holding an electrolyte, and a pump connected to the electrochemical cell and the tank to circulate the electrolyte. The electrochemical cell has large $\gamma$ and $\beta$ values, which has high transport resistance from diffusion and there is limited salt in the electrolyte solution to compensate. A computer system can implement a model of a convection enhanced energy storage system, for example for simulation to select parameters for such an energy storage system. The model includes: a convection term in a Nernst-Planck equation representing the convection enhanced energy storage system; boundary conditions of a cell of the convection enhanced energy storage system to account for forced convection at boundaries; gauging conservation of anions within an external tank; and calculating electrode active area as a function of porosity.

21 Claims, 21 Drawing Sheets

(51) Int. Cl.
| | |
|---|---|
| *H01M 10/42* | (2006.01) |
| *H01M 4/02* | (2006.01) |
| *H01M 4/133* | (2010.01) |
| *H01M 4/134* | (2010.01) |
| *H01M 4/505* | (2010.01) |
| *H01M 4/525* | (2010.01) |
| *H01M 4/587* | (2010.01) |

(52) U.S. Cl.
CPC ...... *H01M 2004/028* (2013.01); *H01M 4/133* (2013.01); *H01M 4/134* (2013.01); *H01M 4/505* (2013.01); *H01M 4/525* (2013.01); *H01M 4/587* (2013.01); *H01M 2300/0028* (2013.01)

(58) Field of Classification Search
CPC ............. H01M 4/525; H01M 4/587; H01M 2004/027; H01M 2004/028; H01M 2300/0028; Y02E 60/10
See application file for complete search history.

(56) References Cited

U.S. PATENT DOCUMENTS

| | | | |
|---|---|---|---|
| 8,187,737 B2 | 5/2012 | Fischel | |
| 8,283,062 B2 | 10/2012 | Fischel | |
| 8,911,893 B2 | 12/2014 | Suppes | |
| 9,076,996 B2* | 7/2015 | Bradwell | H01M 10/617 |
| 9,461,298 B2 | 10/2016 | Suppes | |
| 9,590,228 B1* | 3/2017 | Wang | H01M 10/654 |
| 9,680,172 B2 | 6/2017 | Polcyn et al. | |
| 10,522,856 B2 | 12/2019 | Fischel | |
| 2007/0111089 A1* | 5/2007 | Swan | H01M 50/536 429/162 |
| 2014/0255812 A1 | 9/2014 | Fischel | |
| 2016/0099484 A1* | 4/2016 | Abraham | H01M 10/569 429/149 |
| 2017/0207476 A1 | 7/2017 | Suppes et al. | |
| 2019/0348669 A1 | 11/2019 | Carney et al. | |

OTHER PUBLICATIONS

Wikipedia [Diffusive flux] (Year: 2023).*
University of Utah [Fluxes] (Year: 2012).*
Linkedin [Effective Diffusivity] (Year: 2023).*
Ahmed et al., Enabling Fast Charging—A Battery Technology Gap Assessment. Journal of Power Sources 2017, 367, 250-262.
Bills et al., Performance metrics required of next-generation batteries to electrify commercial aircraft. ACS Energy Lett. 2020; 5: 663-8.
Blomgren et al., The development and future of lithium-ion batteries. J Electrochem Soc. 2017; 164(1): A5019-25.
Gallagher et al., Optimizing areal capacities through understanding the limitations of lithium-ion electrodes. J Electrochem Soc. 2016; 163(2): A138-49.
Gao et al., Understanding the impact of convective transport on intercalation batteries through dimensional analysis. J Electrochem Soc. 2020; 167: 140551.
Nykvist et al., Rapidly falling cots of battery packs for electric vehicles. Nat Clim Change Lett. 2015; 5: 329-3.
Patry et al., Cost modeling of lithium-ion battery cells for automotive applications. Energy Science Eng. 2015; 3(1): 71-82.
Schmuch et al., Performance and cost of materials for lithium-based rechargeable automotive batteries. Nat Energ 2018; 3: 267-78.
Tan et al., Evolution of electrochemical cell designs for in-situ and operando 3D characterization. Mater. 2018; 11:2157. 16 pages.
Torchio et al., LIONSIMBA: A Matlab framework based on a finite volume model suitable for Li-Ion battery design, simulation, and control. J Electrochem Soc. 2016; 163(7): A1192-205.
Xu, Nonaqueous liquid electrolytes for lithium-based rechargeable batteries. Chem Rev. Oct. 2004;104(10):4303-417.

[No Author Listed], Monthly Energy Review. U.S. Energy Information Administration. 2017; 245 pages.
[No Author Listed], Annual Energy Outlook 2015 with projections to 2040. U.S. Energy Information Administration. 2015; 154 pages.
[No Author Listed], Rising above the gathering storm energizing and employing America for a brighter economic future. National Academy of Sciences. National Academies Press. Washington. 2007: 591 pages.
[No Author Listed], Fortran Programs for the simulation of electrochemical systems. Last accessed, Sep. 19, 2023, at <http://www.cchem.berkeley.edu/jsngrp/fortran.html>. 2 pages.
[No Author Listed], COMSOL Batteries & Fuel Cells Module website. Last accessed, Sep. 19, 2023, at <https://www.comsol.com/batteries-and-fuel-cells-module>. 15 pages.
Billaud et al., Magnetically aligned graphite electrodes for high-rate performance Li-ion batteries. Nat Energy. Jul. 2016; 1: 16097.
Cai et al., Mathematical modeling of a lithium ion battery with thermal effects in COMSOL Inc. Multiphysics (MP) software. J Power Sources. 2011; 196: 5985-89.
Campbell et al., Optimising lithium-ion cell design for plug-in hybrid and battery electric vehicles. J Energy Stor. Apr. 2019; 22: 228-38.
Colclasure et al., Requirements for enabling extreme fast charging of high energy density Li-Ion cells while avoiding lithium plating. J Electrochem Soc. 2019; 166(8): A1412-24.
Dornbusch et al., Experimental validation of the elimination of dendrite short-circuit failure in secondary lithium-metal convection cell batteries. J Electrochem Soc. 2015; 162(3): A262-8.
Doyle et al., Comparison of modeling predictions with experimental data from plastic lithium ion cells. J Electrochem Soc. 1996; 143: 1890-903.
Doyle, Design and simulation of lithium rechargeable batteries. Ph.D. Thesis, University of California, Berkeley. Lawrence Berkeley Laboratory. Aug. 1995; 382 pages.
Du et al., Enabling fast charging of high energy density Li-ion cells with high lithium ion transport electrolytes. Electrochem Commun. 2019; 103: 109-13.
Ehleringer et al., A history of atmospheric $CO_2$ and its effects on plants, animals, and ecosystems. Ecological Studies. Springer. NY, NY. 2005; 36 pages.
Fleckenstein et al., Current density and state of charge inhomogeneities in Li-ion battery cells with LiFePO4 as cathode material due to temperature gradients. J Power Sources. 2011; 196: 4769-778.
Franco et al., Boosting Rechargeable Batteries R&D by Multiscale Modeling: Myth or Reality? Chem Rev. Apr. 10, 2019;119(7):4569-4627. doi: 10.1021/acs.chemrev.8b00239. Epub Mar. 12, 2019.
Gordon et al., Convection battery-modeling, insight, and review. AlChe J. Aug. 2013; 59(8): 2833-42.
Gordon et al., Li-ion battery performance in a convection cell configuration. AlChE J. May 2013; 59(5): 1774-9.
Hannan et al., The value of thermal management control strategies for battery energy storage in grid decarbonization: Issues and recommendations. J Cleaner Prod. 2020; 276: 124223.
Hindmarsh et al., SUNDIALS: Suite of nonlinear and differential/algebraic equation solvers. ACM Trans Math Soft. Sep. 2005; 31(3): 363-96.
Huang et al., Coral-like directional porosity lithium ion battery cathodes by ice templating. J Mater Chem A. 2018; 6: 14689-99.
Kim et al., Improved fast charging capability of graphite anodes via amorphous $Al_2O_3$ coating for high power lithium ion batteries. J Power Sources. 2019; 422: 18-24.
Kim et al., Increasing the rate capability of batteries with electrolyte flow. Appl Energy. 2013; 103: 207-11.
Krewer et al., Review—dynamic models of Li-ion batteries for diagnosis and operation: a review and perspective. J Electrochem Soc. 2018; 165(16): A3656-73.
Li et al., High-voltage positive electrode materials for lithium-ion batteries. Chem Soc Rev. May 22, 2017;46(10):3006-3059.
Logan et al., A study of the physical properties of Li-Ion battery electrolytes containing esters. J Electrochem Soc. 2018; 165(2): A21-30.

(56) References Cited

OTHER PUBLICATIONS

Luo et al., Overview of current development in electrical energy storage technologies and the application potential in power system operation. Appl Energy. 2015; 137:511-36.

Malifarge et al., Experimental and modeling analysis of graphite electrodes with various thicknesses and porosities for high-energy-density Li-Ion batteries. J Electrochem Soc. 2018: 165(7): A1275-87.

Mohammadian et al., Internal cooling of a lithium-ion battery using electrolyte as coolant through microchannels embedded inside the electrodes. J Power Sources. 2015; 293: 458-66.

Ramadesigan et al., Modeling and simulation of lithium-ion batteries from a systems engineering perspective. J Electrochem Soc. 2012; 159: R31-45.

Sander et al., High-performance battery electrodes via magnetic templating. Nat Energy. Jul. 2016; 1: 16099.

Suppes et al., High-energy density flow battery validation. Environ Energy Eng. Jul. 2011; 57(7): 1961-7.

Tan et al., Evolution of Electrochemical Cell Designs for In-Situ and Operando 3D Characterization. Materials (Basel). Nov. 1, 2018;11(11):2157.

Tian et al., Niobium doped lithium titanate as a high rate anode material for Li-ion batteries. Electrochim Acta. 2010; 55: 5453-8.

Valuen et al., Transport properties of $LiPF_6$-based Li-ion battery electrolytes. J Electrochem Soc. 2005; 152(5): A882-91.

Videa et al., High $Li^+$ self-diffusivity and transport number in novel electrolyte solutions. J Electrochem Soc. 2001; 148(12): A1352-6.

Xu et al., Graphene-based electrodes for electrochemical energy storage. Energy Environ Sci. 2013; 6: 1388-414.

Yang et al., Fast charging of lithium-ion batteries at all temperatures. Proc Natl Acad Sci U S A. Jul. 10, 2018;115(28):7266-7271. doi: 10.1073/pnas.1807115115. Epub Jun. 25, 2018.

Yuan et al., Synthesis of pristine and carbon-coated $Li_4Ti_5O_{12}$ and their low-temperature electrochemical performance. J Power Sources. 2010; 195: 4997-5004.

Zhao et al., Effect of tab design on large-format Li-ion cell performance. J Power Sources. 2014; 257:70-9.

Zhu et al., In-situ heat generation measurement of the anode and cathode in a single-layer lithium ion battery cell. Int J. Ener Res.

Zubi et al., The lithium-ion batter: state of the art and future perspectives. Renew Sustain Energy Rev. 2018; 89: 292-308.

\* cited by examiner $$\xi = \frac{I_{app}(1-t_+)}{\frac{FD_{eff}c_{initial}}{L} + Fvc_{initial}} = \frac{\gamma}{1+Pe}$$

$$\xi = \frac{I_{app}(1-t_+)}{\frac{F D_{eff} c_{initial}}{L} + Fvc_{initial}} = \frac{\gamma}{1+Pe}$$

| Symbol | Unit | Value |
|---|---|---|
| $b$ | - | 2.5 |
| $c_{initial}$ | [mol/m$^3$] | 100 – 1500 |
| $D$ | [m$^2$/s] | $10^{-13} - 10^{-6}$ |
| $D_{eff}$ | [m$^2$/s] | $D\varepsilon^b$ |
| $F$ | [C/mol] | 96487 |
| $I_{app}$ | [A/m$^2$] | 10 – 300 |
| $L$ | [m] | $8 \times 10^{-5}$ |
| $Q_A$ | [C/m$^2$] | 96073 |
| $R$ | [J/mol/K] | 8.314 |
| $T$ | [K] | 298.15 |
| $t_+$ | - | 0 – 1 |
| $v$ | [m/s] | 0 – 0.01 |
| $\varepsilon$ | - | 0.4 |
| $\varepsilon_{filler}$ | - | 0.025 |
| $\sigma$ | [S/m] | 100 |
| $\sigma_{eff}$ | [S/m] | $\sigma(1 - \varepsilon - \varepsilon_{filler})$ |
| $\kappa_{eff}$ | [S/m] | varies with $c_e^a$ |
| $t_{dis}$ | [s] | $Q/I_{app}$ |

*FIG. 9*

| Dimensionless group | Expression | Meaning |
| --- | --- | --- |
| $\gamma$ | $\dfrac{I_{app}(1-t_+)L}{FD_{eff}c_{initial}}$ | $\dfrac{\text{migration}}{\text{diffusion}}$ |
| $\zeta$ | $\dfrac{I_{app}(1-t_+)}{\dfrac{FD_{eff}c_{initial}}{L} + Fvc_{initial}} = \dfrac{\gamma}{1+Pe}$ | $\dfrac{\text{migration}}{\text{diffusion} + \text{convection}}$ |
| $Pe$ | $\dfrac{Lv}{D_{eff}}$ | $\dfrac{\text{convection}}{\text{diffusion}}$ |
| $\beta$ | $\dfrac{I_{app}t_{dis}(1-t_+)}{Fc_{initial}\varepsilon L} = \dfrac{Q_A(1-t_+)}{Fc_{initial}\varepsilon L}$ | $\dfrac{\text{migration}}{\text{flux causing electrolyte salt depletion}}$ |
| $\delta'$ | $\dfrac{FI_{app}L}{RT}\left(\dfrac{1}{\kappa_{eff}} + \dfrac{1}{\sigma_{eff}}\right)$ | Dimensionless ohmic potential drop |

*FIG. 10*

|  | Units | Positive Electrode | Separator | Negative Electrode |
|---|---|---|---|---|
|  | - | $Li_\theta CoO_2$ | - | $Li_\theta C_6$ |
| $a$ | $m^2/m^3$ | 862500 | - | 851100 |
| $b$ | - | 2.5 | 2.5 | 2.5 |
| $c_s^{max}$ | $mol/m^3$ | 51554 | - | 30555 |
| $D^s$ | $m^2/s$ | $1 \times 10^{-14}$ | - | $3.9 \times 10^{-14}$ |
| $k$ | $m^{2.5}/(mol^{0.5}s)$ | $2.334 \times 10^{-11}$ | - | $5.031 \times 10^{-11}$ |
| $L$ | $m$ | $8 \times 10^{-5}$ | $4 \times 10^{-5}$ | $8 \times 10^{-5}$ |
| $n$ | - | 100 | 100 | 100 |
| $R_p$ | $m$ | $2 \times 10^{-6}$ | - | $2 \times 10^{-6}$ |
| $\varepsilon$ | - | 0.4 | 0.4 | 0.4 |
| $\varepsilon_{filler}$ | - | 0.025 | - | 0.0326 |
| $\Theta_{100\%}$ | - | 0.4955 | - | 0.8551 |
| $\Theta_{0\%}$ | - | 0.9917 | - | 0.0066 |
| $\sigma$ | [S/m] | 100 | - | 100 |

*FIG. 11*

| Symbol | Description |
|---|---|
| $a$ | Particle surface area to volume |
| $A_{cell}$ | Cell cross-sectional area |
| $A_{tube}$ | Tube cross-sectional area |
| $b$ | Bruggeman's coefficient |
| $c_e(x,t)$ | Anion concentration in the electrolyte |
| $c_{initial}$ | Initial electrolyte concentration |
| $c_{tank}(t)$ | Tank concentration |
| $c_{s,max}$ | Maximum solid-phase concentration |
| $D_{bulk}$ | Electrolyte diffusivity of a free solution |
| $D_{eff}$ | Effective electrolyte diffusivity |
| $D_s$ | Solid-phase diffusivity |
| $F$ | Faraday constant |
| $I_{app}$ | Applied current density |
| $j(x,t)$ | Ionic flux |
| $k$ | Reaction rate constant |
| $L$ | Thickness |
| $n$ | Number of control volumes used |
| $Q_A$ | Areal capacity |
| $R$ | Gas constant |
| $R_p$ | Particle radius |
| $T$ | Absolute temperature |
| $t_{dis}$ | Time to completely charge or discharge battery at $I_{app}$ |
| $t_+$ | Li$^+$ transference number |
| $v$ | Superficial velocity in the cell |
| $v_{tube}$ | Superficial velocity in the tube |
| $V_{tank}$ | Tank volume |
| $\varepsilon$ | Porosity |
| $\varepsilon_{filler}$ | Filler fraction |
| $\Theta_{100\%}$ | Stoichiometry at 100% SoC |
| $\Theta_{0\%}$ | Stoichiometry at 0% SoC |
| $\kappa_{eff}$ | Effective electrolyte conductivity |
| $\sigma$ | Solid-phase conductivity |
| $\sigma_{eff}$ | Effective solid-phase conductivity |

*FIG. 12*

CONVECTION-ENHANCED ELECTROCHEMICAL ENERGY STORAGE DEVICES AND RELATED METHODS

RELATED APPLICATIONS

This application claims priority under 35 U.S.C. § 119 (e) to U.S. Provisional Application No. 63/093,740, filed Oct. 19, 2020, and entitled "Convection-Enhanced Electrochemical Energy Storage Device," which is incorporated herein by reference in its entirety for all purposes.

TECHNICAL FIELD

Convection-enhanced electrochemical energy storage devices and related methods are generally described.

BACKGROUND

Many electrochemical energy storage devices have a stagnant electrolyte. An electrochemical energy storage device may have an electrolyte that is circulated within the device. However, there is little information available regarding potential and conditional benefits of such devices, in terms of their geometric, physical, and operating parameters. Most simulation software for energy storage devices presumes the electrolyte is stagnant. Accordingly improved devices and methods are desired.

SUMMARY

Convection-enhanced electrochemical energy storage devices and related methods are generally disclosed herein. The subject matter of the present disclosure involves, in some cases, interrelated products, alternative solutions to a particular problem, and/or a plurality of different uses of one or more systems and/or articles.

In one aspect, a method of operating an electrochemical cell with convection is described, the method comprising circulating a single electrolyte comprising an electroactive species in an electrochemical cell comprising a positive electrode, a separator, a negative electrode; and applying a voltage between the positive electrode and the negative electrode to generate an electromigrative flux of the electroactive species, wherein the electromigrative flux of the electroactive species is less than a sum of the diffusive flux of the electroactive species and the convective flux of the electrolyte.

In another aspect, a method of operating an electrochemical cell with convection is described, the method comprising circulating a single electrolyte in an electrochemical cell comprising a positive electrode, a separator, a negative electrode; and applying a voltage between the positive electrode and the negative electrode to generate an electromigrative flux of an electroactive species within the single electrolyte, wherein a ratio of an applied current density to an effective diffusivity is greater than 1, and wherein a ratio of a convective flowrate to an initial electrolyte concentration is greater than 1.

In another aspect, a convection-enhanced system is described, the system comprising a positive electrode comprising a lithium intercalation compound; a separator adjacent to the positive electrode; a negative electrode adjacent to the separator, the negative electrode comprising lithium-intercalated graphite or lithium metal; a tank holding a single electrolyte; and a pump connected to the tank to circulate the electrolyte, wherein the pump is configured to provide an average flow rate to the electrolyte of greater than or equal to 0.001 μm/s.

This summary introduces a selection of concepts in simplified form that are described further below in the Detailed Description. This summary neither identifies key or essential features, nor limits the scope, of the claimed subject matter.

Convection has been shown to provide performance improvements in convention enhanced energy storage systems where the electrochemical cell has large $\gamma$ and $\beta$ values, which has high transport resistance from diffusion and there is limited salt in the electrolyte solution to compensate. Some examples include where the electrochemical cell has high applied current density, low electrode porosity, low $Li_+$ transference number, or active materials with high specific capacity.

A convection enhanced energy storage system includes an electrochemical cell comprising a positive electrode, a separator, and a negative electrode, a tank holding an electrolyte, the electrolyte also further circulated through the electrochemical cell, and a pump connected to the electrochemical cell and the tank to circulate the electrolyte. In some implementations, the electrochemical cell has large $\gamma$ and $\beta$ values, which has high transport resistance from diffusion and there is limited salt in the electrolyte solution to compensate. In some implementations, the electrochemical cell has high applied current density. In some implementations, the electrochemical cell has low electrode porosity. In some implementations, the electrochemical cell has low $Li_+$ transference number. In some implementations, the electrochemical cell has active materials with high specific capacity.

A computer system can implement a model of a convection enhanced energy storage system, for example for simulation to select parameters for such an energy storage system. The model includes one or more of the following: a convection term in a Nernst-Planck equation representing the convection enhanced energy storage system; boundary conditions of a cell of the convection enhanced energy storage system to account for forced convection at boundaries; gauging conservation of anions within an external tank; and calculating electrode active area as a function of porosity. The following Detailed Description references the accompanying drawings which form a part this application, and which show, by way of illustration, specific example implementations. Other implementations may be made without departing from the scope of the disclosure.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 9 shows a table with several values of select parameters, according to one set of embodiments;

FIG. 10 shows a table with several dimensionless quantities, according to one set of embodiments;

FIG. 11 shows a table with several values of select parameters, according to one set of embodiments;

FIG. 12 shows table with several variables, defined, according to some embodiments;

DETAILED DESCRIPTION

Figure 1A:
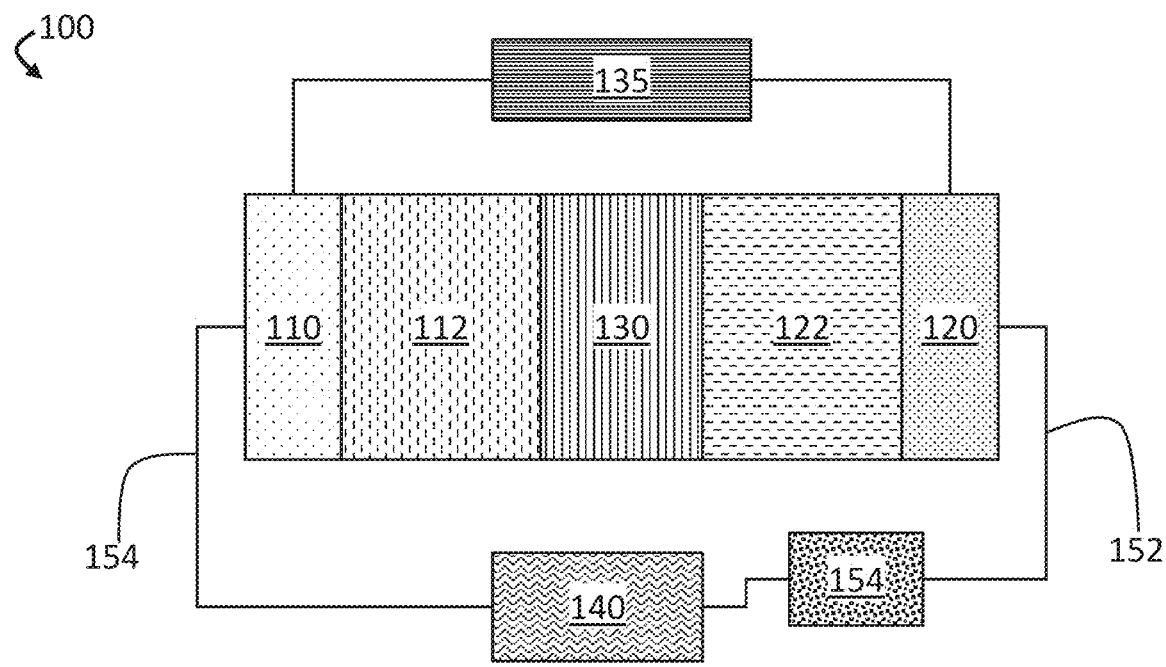
FIG. 1A is a schematic diagram of a convection-enhanced system including an electrochemical cell, according to some embodiments.

Systems and methods related to convection-enhanced electrochemical cells are generally described herein. Many conventional electrochemical cells do not provide convection, which can lead to poor electrochemical cell performance, including poor heat transport within the electrochemical cell, insufficient or excessive concentration of an electroactive species within the electrochemical cell, and sluggish reaction kinetics at the positive electrode and/or the negative electrode within the electrochemical cell. While providing convection, i.e., active, bulk motion due to an applied, nonzero flow velocity, to the electrolyte may improve the performance of the electrochemical cell, a lack of understanding of how electrolyte convection correlates to other electrochemical cell properties and parameters has precluded widespread adoption of convection in electrochemical cells and batteries.

However, it has been recognized and appreciated within the context of present disclosure that convection may remarkably improve the performance of an electrochemical cell (e.g., charge/discharge capacity, C-rate-based performance). By reevaluating the known Nernst-Planck equation with a new convection term that models electrolyte flow within an electrochemical cell, the mass transport limitations of conventional electrochemical cells and/or batteries can be overcome. Advantageously, providing convection to an electrochemical cell may enable a more uniform electrolyte concentration throughout the electrochemical cell and may also allow for the use of thicker electrodes or operations at high currents while maintaining high accessed capacity relative to an electrochemical without convection (with all other relevant factors being essentially the same). Conventional electrochemical cells typically use relative thin electrodes but providing convection to the electrochemical cell allows for thicker electrodes to be used. In some cases, convection may remarkably improve the performance of certain existing electrochemical cells that originally lacked a source of forced convection.

The systems and methods described herein are generally applicable to convection-enhanced electrochemical cells or convection batteries. Those skilled in the art understand that a convection-enhanced electrochemical cell or a convection battery is distinct from a flow cell battery. A flow cell battery uses two liquid electrolytes, a catholyte and an anolyte, each of which comprises a cathode active material and an anode active material, respectively. By contrast, a convection battery may use a single electrolyte circulated to both the positive electrode (e.g., a cathode) and the negative electrode (e.g., an anode), wherein a solid, positive electrode comprises the cathode active material and/or a solid, negative electrode comprises the anode active material. Thus, those skilled in the art would also understand the electrolyte requirements of a convection battery with a single electrolyte are distinct from those of flow cell batteries with two electrolytes, a catholyte and an anolyte.

In some embodiments, the systems and methods described herein for operating an electrochemical cell may be understood by physically interpreting the electrochemical cell as comprising a convection term. In some embodiments, computer software may be used to modify the physical interpretation of the electrochemical cell to include the convection term. Without wishing to be bound by any particular theory, the Nernst-Planck equation can be modified at the boundary conditions to allow for electrolyte flow into, within, and/or out of the electrochemical and/or to introduce an electrolyte tank. In some embodiments, the physical interpretation may be a function of one or more electrochemical cell parameters, including cell dimensions, electrode, electrolyte, and separator properties, as well as electrochemical and fluid dynamic operating conditions, without limitation. In some embodiments, the physical interpretation may guide design dimensions, material properties, operation ranges of an electrochemical cell. Additional details regarding computer implementation are described elsewhere herein.

In some embodiments, the physical description of the convection-enhanced electrochemical cell can be modeled. In some embodiments, a set of partial differential algebraic equations is generated. In some cases, to model the system, it may be assumed that the cell is mixed radially, but may contain spatial temperature, concentration, or potential gradients in the axial dimension. In some embodiments, the set of PDAEs is subsequently reformulated into ordinary differential-algebraic equations (DAEs) using a finite volume method (FVM) by partitioning the spatial domain into discrete volumes or cells, each with constant properties. Without wishing to be bound by any particular theory, through the FVM formulation, as opposed to a finite difference solution, boundary conditions involving a specified external flux may be treated exactly, rather than as an approximation. In some embodiment, a system of equations is solved numerically. In some embodiments, to explain conditional convection cell performance enhancement, the physical interpretation may be modified with dilute solution theory to enable the physical interpretation to capture parameters related to transport modes. In some embodiments, the physical interpretation may electrolyte accumulation/depletion rate (defined, at least in part, by the term $c_{initial\varepsilon_i}Lt_{dis}^{-1}$), a diffusive flux (defined, at least in part, by the term $D_{eff}c_{initial}L^{-1}$), convective flux (defined, at least in part, by the term $vc_{initial}$) and/or an electromigrative flux (defined, at least in part, by the term $(1-t_+)I_{app}F^{-1}$).

In some embodiments, a method for operating an electrochemical cell with convection is described. For example, referring now to FIG. 1A, a convection-enhanced system 100 is shown. The system 100 comprises a positive electrode 110 and a negative electrode 120 separated by a separator 130. The separator 130 may divide the system 100 into a positive electrode side 112 and a negative electrode side 122, which may each contain a single electrolyte (not pictured) shared between both sides, such that the single electrolyte may freely pass through the separator 130 while providing a degree of separation between the positive electrode side 112 and the negative electrode 122. Also shown in the figure is an electrical load 135, which may represent a source of power being taken from the system (e.g., a light bulb, a computer, a vehicle).

In some embodiments, systems and methods may also include tank for containing an electrolyte (e.g., a single electrolyte) and a pump for flowing the electrolyte through the tank and within the electrochemical cell. For example, in FIG. 1A, system 100 includes a tank 140 connected to and operatively associated with a pump 150. The pump 150 is configured to provide convective flux to the system 100 and may flow electrolyte into the electrochemical cell via a cell inlet 152 and the electrolyte may flow out of the cell into the tank 140 via cell outlet 154. The inlets and/or outlets can be channels, conduits, and/or tubes, or any other suitable pathway to flow a fluid. In some embodiments, the inlets and outlet may be configured to reverse the flow of a fluid, such that an inlet may be configured into an outlet and an outlet may be configured into an inlet. And while the figure depicts an inlet and an outlet, it should be understood that the system and methods described herein may have any suitable number of inlets and/or outlets (e.g., 3 inlets and/or outlets, 4 inlets and/or outlets, 5 inlets and/or outlets, 6 inlets and/or outlets) as this disclosure is not so limited.

Figure 1B:
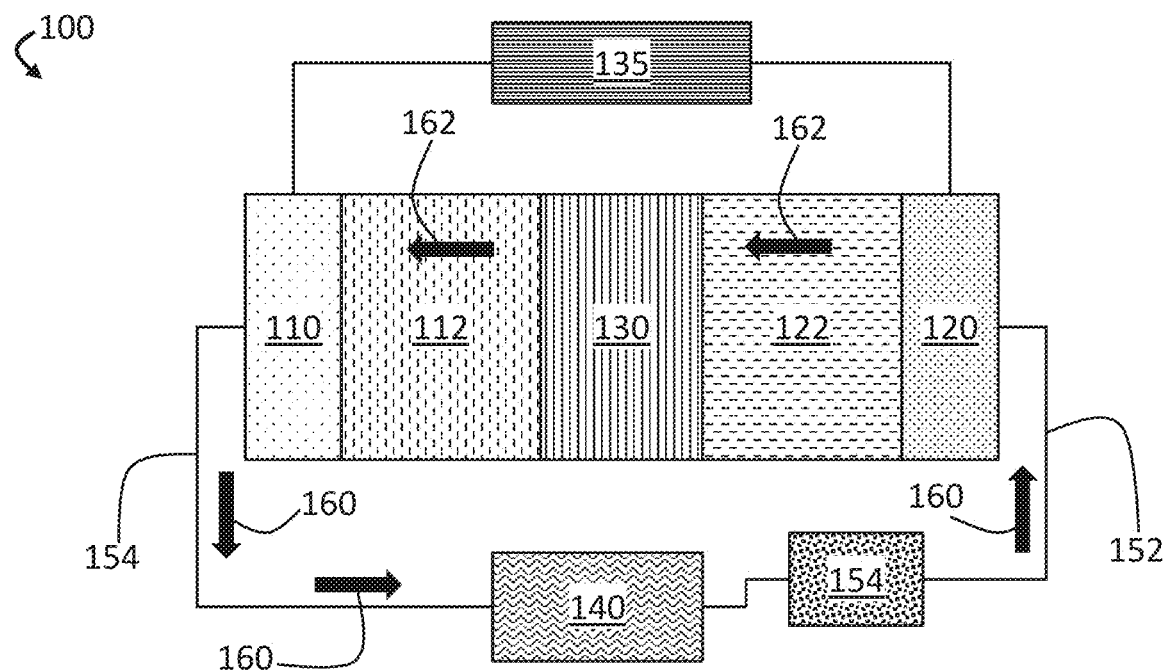
FIG. 1B is a schematic diagram of a convection-enhanced system including an electrochemical cell whereby convection of the electrolyte has been initiated by a pump within the system, according to some embodiments.

In some embodiments, the method may comprise circulating a single electrolyte comprising an electroactive species in an electrochemical cell comprising a positive electrode, a separator, a negative electrode. For example, as shown in FIG. 1B, the pump 154 may be actuated to generate circulation within the system 100, illustrated schematically by flows 160. Once circulation of the electrolyte initiates, a convective flux 162 is created within the electrochemical cell, such that the electrolyte circulates within the electrochemical cell and can flow into and out of the cell via the cell inlet 152 and the cell outlet 154, respectively. In some embodiments, the electrolyte comprises an electroactive species (or a salt or counterion of an electroactive species), such that circulating the electrolyte (e.g., a single electrolyte) comprises circulating an electroactive species in an electrochemical cell.

Various embodiments described herein use a pump in order to circulate the electrolyte. However, it should be understood that any suitable technique may be used to generate a convective flux. In some embodiments, a stir bar (e.g., a magnetic stir bar), a stir plate, a scintillator, a sonicator, vortex mixer, and/or a membrane (e.g., the deflection of a membrane), without limitation, may be used to provide flow or convection to the electrolyte. Other techniques to provide convection are possible as this disclosure is not so limited.

In some embodiments, the method comprises applying a voltage between the positive electrode and the negative electrode to generate an electromigrative flux of an electroactive species. That is, a voltage may be applied across the positive electrode and the negative electrode such that an electroactive species migrates to or from the electrodes to the electrolyte or from the electrolyte, depending on the polarity of the electrode. The electroactive species may be associated with or be an oxidation-reduction (redox) couple of another chemical species or a counterion of the electroactive species, and those skilled in the art in view of the present disclosure will understand that the electroactive species can be directly related to redox couple of the electroactive species and/or a counterion of the electroactive species. Thus, upon application of a voltage, an electromigrative flux of the electroactive species and/or a redox couple of the electroactive species and/or a counterion of the electroactive species may result. However, in some embodiments, the electromigrative flux may refer to just the electroactive species, such as lithium ions within the electrolyte, as a non-limiting example.

The system and methods described herein may also describe a diffusive flux of an electroactive species, or some other species, within the electrolyte. The diffusive flux is directly related to the diffusion of a chemical species within the electrolyte (i.e., a solvent of the electrolyte). It has been recognized and appreciated within the context of the present disclosure that, in some embodiments, convection-enhanced systems (e.g., convection batteries) may have improved performance when the sum of the convective flux of an electroactive species and the diffusive flux of the electroactive species is greater than the electromigrative flux of the electroactive species (e.g., greater than one third the electromigrative flux) relative to an electrochemical cell without convection when all other relevant factors are essentially the same. In some embodiments, the sum of the convective flux and the diffusive flux is greater than the electromigrative flux relative to an electrochemical cell without convection with all other relevant factors are essentially the same. By way of illustration and not limitation, an electrochemical cell comprising a NMC positive electrode, a lithium metal negative electrode, and a single electrolyte comprising $LiPF_6$, without convection, may perform better with convection when the added convective flux is greater than the sum of the diffusive flux and the electromigrative flux relative and using essentially the same NMC positive electrode, essentially the same lithium metal negative electrode, and essentially the same single electrolyte comprising $LiPF_6$. However, some other factors, which would be apparent to those of ordinary skill in the art, are not relevant to the outcome and can change.

In some embodiments, the electrolyte is flowed at a particular average velocity. For example, in some embodiments, circulating comprises flowing the single electrolyte with an average velocity of greater than or equal to 0.001 µm/s and/or less than or equal to 10,000 µm/s. In some embodiments, circulating comprises flowing the electrolyte (e.g., a single electrolyte) with an average velocity of greater than or equal to 0.0001 µm/s, greater than or equal to 0.001 µm/s, greater than or equal to 0.01 µm/s, greater than or equal to 0.1 µm/s, greater than or equal to 1 µm/s, greater than or equal to 2 µm/s, greater than or equal to 3 µm/s, greater than or equal to 4 µm/s, greater than or equal to 5 µm/s, greater than or equal to 10 µm/s, greater than or equal to 20 µm/s, greater than or equal to 50 µm/s, greater than or equal to 100 µm/s, greater than or equal to 500 µm/s, greater than or equal to 1,000 µm/s, greater than or equal to 2,500 µm/s, greater than or equal to 5,000 µm/s, or greater than or equal to 10,000 µm/s. In some embodiments, circulating comprise flowing the electrolyte with an average velocity of less than or equal to 10,000 µm/s, less than or equal to 5,000 µm/s, less than or equal 2,500 µm/s, less than or equal to 1,000 µm/s, less than or equal to 500 µm/s, less than or equal to 100 µm/s, less than or equal to 50 µm/s, less than or equal to 20 µm/s, less than or equal to 10 µm/s, less than or equal to 5 µm/s, less than or equal to 4 µm/s, less than or equal to 3 µm/s, less than or equal to 2 µm/s, less than or equal to 1 µm/s, less than or equal to 0.1 µm/s, less than or equal to 0.01 µm/s, less than or equal to 0.001 µm/s, or less than or equal to 0.0001 µm/s. Combinations of the above-referenced ranges are also possible (e.g., greater than or equal to 0.0001 µm/s and less than or equal to 10,000 µm/s). Other ranges are possible. In some embodiments, one more of the fluxes of an electroactive species (e.g., convective flux, diffusive flux, electromigrative flux) may be related to other parameters of the electrochemical cell. For example, electroactive flux may be related to an initial concentration of the electrolyte. In some embodiments, a ratio of an applied current density less the current density carried by the electroactive species per Faraday to the diffusive flux is greater than 0.5 and a ratio of an areal capacity less the charge per area carried by the electroactive species per Faraday to an initial electroactive species molar amount in the electrolyte is greater than 0.5. In some embodiments, $$\frac{I_{app}(1-t_+)L}{FD_{eff}c_{initial}} > 0.5 \text{ and } \frac{Q_A(1-t_+)}{Fc_{initial}\varepsilon L} > 0.5,$$

where $I_{app}$ defines an applied current density, $t_+$ defines a transference number of the electroactive species of the electrolyte, L defines a dimension of the electrochemical cell or electrode, $D_{eff}$ defines an effective diffusivity of the electrolyte, $c_{initial}$ defines the initial concentration of the electrolyte, $Q_A$ defines a areal capacity of the electrochemical cell or an electrode, and $\varepsilon$ defines an electrode porosity. In some embodiments, the electrochemical cell satisfies $$\frac{I_{app}(1-t_+)L}{FD_{eff}c_{initial} + Fvc_{initial}L} < 3,$$

where $I_{app}$ defines an applied current density, $t_+$ defines a transference number of the electroactive species of the electrolyte, L defines a dimension of the electrochemical cell, $D_{eff}$ defines an effective diffusivity of the electrolyte, $c_{initial}$ defines the initial concentration of the electrolyte.

In some embodiments, a relationship between a first parameter of the system and (e.g., diffusive flux, electromigrative flux) and a second parameter of the system (e.g., convective flux) are related and expressed as a dimensionless quantity. Advantageously, expressing these parameters without dimensions may aid in determining the efficacy, cost-benefits, and/or upper performance bounds of convection in an electrochemical cell. Certain existing electrochemical cells fail to determine the adequate operating parameters of convection (e.g., electrolyte flowrate, velocity) for a given set of conditions (e.g., electrode type, electrode porosity, transference number, electrolyte diffusivity, concentration, cell charge/discharge capacity, C-rate). However, it has been recognized and appreciated by this disclosure that relating these parameters and/or expressing these parameters as dimensionless quantities allows for the determination of improved convection parameters and for the determination of when convection is advantageous and when it is not for a given an electrochemical cell.

In some embodiments, an electromigrative flux and a diffusive flux are expressed as a ratio. In some such embodiments, the ratio may include other parameters. In some embodiments, the ratio of electromigrative flux to diffusive flux is defined by $\gamma$ and $$\gamma = \frac{I_{app}(1-t_+)L}{FD_{eff}c_{initial}}.$$

In some embodiments, the ratio of electromigrative flux to diffusion flux is greater than 0.5, such that $$\frac{I_{app}(1-t_+)L}{FD_{eff}c_{initial}} > 0.5.$$

Various embodiments describe an electrochemical cell enhanced with convection of the electrolyte. In some embodiments, the electrochemical cell comprises a positive electrode, a separator, and a negative electrode. The electrochemical cell (or a system comprising the electrochemical cell) may also comprise a tank holding an electrolyte, the electrolyte also further circulated through the electrochemical cell and a pump connected to the electrochemical cell and the tank to circulate the electrolyte. In some embodiments, the electrochemical cell may further comprise a current collector adjacent to the positive electrode and/or the negative electrode. Details regarding electrochemical cell components are provided below and elsewhere herein.

In some embodiments, the electrochemical cell comprises a positive electrode. In some embodiments, the positive electrode is a cathode. Many positive electrode materials or cathode materials are known in the art, and those skilled in the art in view of the present disclosure will be capable of selecting an appropriate positive electrode material or cathode material and also select the appropriate convection conditions to complement the positive electrode. In some embodiments, the positive electrode comprises a lithium intercalation compound, such as a nickel-manganese-cobalt (NMC) oxide compound or nickel cobalt aluminum (NCA) oxide that can reversibly intercalate and de-intercalate lithium ions. For example, the NMC compound may be a layered oxide, such as lithium nickel manganese cobalt oxide, $LiNi_xMn_yCo_zO_2$ or lithium nickel cobalt aluminum oxide, $LiNi_xCo_yAl_zO_2$ In some such embodiments, the sum of x, y, and z is 1. Other non-limiting examples of positive electrode materials include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, and $LiCo_xNi_{(1-x)}O_2$, where the value of x may be greater than or equal to 0 and less than or equal to 2 and the value of y may be greater than 0 and less than or equal to 2.

In some embodiments, the positive electrode material may be doped with one or more dopants to alter the electrical properties (e.g., electrical conductivity) of the cathode active material. Non-limiting examples of suitable dopants include aluminum, niobium, silver, and zirconium.

In some embodiments, the electrochemical cell comprises a negative electrode. In some embodiments, the negative electrode is an anode. Various negative electrode materials and anode active materials are known in the art, and those skilled in the art in view of the present disclosure will be capable of selecting an appropriate negative electrode material or anode active material and also select the appropriate convection conditions to complement the negative electrode.

In some embodiments, the negative electrode comprises graphite or a graphitic material. For example, the negative electrode can comprise lithium-intercalated graphite. In some embodiments, the negative electrode comprises lithium metal. Other non-limiting examples of negative electrode materials include synthetic graphites, lithium titanate, silicon, and/or tin.

In some embodiments, the positive electrode and/or the negative electrode may independently have a current collector positioned adjacent to it. A variety of current collectors are known in the art. Suitable current collectors may include, for example, metals, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein. In some embodiments, the current collector is or includes one or more conductive metals such as aluminum, copper, magnesium, chromium, stainless steel and/or nickel. Current collectors may include expanded metals, metal mesh, metal grids, expanded metal grids, metal wool, woven carbon fabric, woven carbon mesh, non-woven carbon mesh, and carbon felt, without limitation. Furthermore, a current collector may be electrochemically inactive. In other embodiments, however, a current collector may comprise an electroactive material or have an electrode active material deposited on a surface of the current collector.

In some embodiments, an electrode (e.g., a positive electrode, a negative electrode) may have a particular porosity. For example, in some embodiments, a porosity of the positive electrode and/or the negative electrode is greater than or equal to 20% and less than or equal to 70%. In some embodiments, the porosity of an electrode is greater than or equal to 20%, greater than or equal to 30%, greater than or equal 40%, greater than or equal to 50%, greater than or equal to 60%, or greater than or equal to 70%. In some embodiments, the porosity of an electrode is less than or equal to 70%, less than or equal to 60%, less than or equal to 50%, less than or equal to 40%, less than or equal to 30%, or less than or equal to 20%. Combinations of the above-referenced ranges are also possible (e.g., greater than or equal to 20% and less than or equal to 70%). Other ranges are possible.

An electrode (e.g., a positive electrode, a negative electrode) may have a particular thickness. For example, in some embodiments, a thickness of the positive electrode is greater than or equal to 5 µm and/or less than or equal to 5 cm. In some embodiments, a thickness of the negative electrode is less than or equal to 5 µm and/or less than or equal to 5 cm. In some embodiments, a thickness of an electrode is greater than or equal to 5 µm, greater than or equal to 10 µm, greater than or equal to 50 µm, greater than or equal to 100 µm, greater than or equal to 250 µm, greater than or equal to 500 µm, greater than or equal to 750 µm, or greater than or equal to 1000 µm. In some embodiments, a thickness of an electrode is less than or equal to 1000 µm, less than or equal to 750 µm, less than or equal to 500 µm, less than or equal to 250 µm, less than or equal to 100 µm, less than or equal to 50 µm, less than or equal to 10 µm, or less than or equal to 5 µm. In some embodiments, a thickness of an electrode is greater than or equal 0.1 cm, greater than or equal to 0.5 cm, greater than or equal to 1 cm, greater than or equal to 2 cm, greater than or equal to 3 cm, or greater than or equal to 5 cm. In some embodiments, a thickness of an electrode is less than or equal to 5 cm, less than or equal to 3 cm, less than or equal to 2 cm, less than or equal to 1 cm, or less than or equal to 0.5 cm, less than or equal to 0.1 cm. Combinations of the above referenced ranges are also possible (e.g., greater than or equal to 5 µm and less than or equal to 5 cm). Other ranges are possible as this disclosure is not so limited.

As mentioned above, the systems and methods described herein may include a separator between the positive electrode and the negative electrode. The separator may be made of any suitable material that provides conductivity to an electroactive species of the system (e.g., Li-ion conductivity) while acting as a barrier to the free flow of electrolyte (although, of course, some electrolyte may permeate the separator through the porosity of the separator).

A separator can be made of a variety of materials. For example, the separator may be or comprises a polymeric material in some instances, or be formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments still, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

As mentioned above and elsewhere herein, the systems and methods described include an electrolyte to circulate within an electrochemical cell. The electrolyte is a liquid that contains electroactive species (and counterions that may be associated with the electroactive species or a redox couple of the electroactive species). In many embodiments, the electrochemical cell contains only a single electrolyte containing one electroactive species. By contrast, as mentioned above, conventional flow cell batteries contain at least two electrolytes, a catholyte and an anolyte. However, many of the convection batteries or convection-enhanced systems described by the present disclosure contain just a single electrolyte.

In some embodiments, an electrolyte (e.g., a single electrolyte) has a particular diffusivity. For example, in some embodiments the single electrolyte has an effective diffusivity of greater than or equal to $1\times10^{-10}$ cm$^2$/s and/or less than or equal to $1\times10^{-1}$ cm$^2$/s. In some embodiments, an electrolyte has a diffusivity of greater than or equal to $1\times10^{-10}$ cm$^2$/s, $1\times10^{-9}$ cm$^2$/s, $1\times10^{-6}$ cm$^2$/s, $1\times10^{-5}$ cm$^2$/s, $10^{-3}$ cm$^2$/s, $1\times10^{-3}$ cm$^2$/s, or $1\times10^{-2}$ cm$^2$/s. In some embodiments, an electrolyte has a diffusivity of less than or equal to $1\times10^{-2}$ cm$^2$/s, $1\times10^{-3}$ cm$^2$/s, $1\times10^{-5}$ cm$^2$/s, $1\times10^{-6}$ cm$^2$/s, $1\times10^{-9}$ cm$^2$/s, or $1\times10^{-10}$ cm$^2$/s. Combinations of the foregoing are also contemplated (e.g., greater than or equal to $1\times10^{-10}$ cm$^2$/s and less than or equal to $1\times10^{-2}$ cm$^2$/s). Of course, other ranges are possible as this disclosure not so limited.

In some embodiments, an electrode (e.g., a positive electrode, a negative electrode) may have a particular areal capacity, $Q_A$. For example, in some embodiments, areal capacity of the positive electrode and/or the negative electrode is greater than or equal to 0.01 mAh/cm$^2$ and less than or equal to 1 Ah/cm$^2$. In some embodiments, the areal capacity of an electrode is greater than or equal to 0.01 mAh/cm$^2$, greater than or equal to 0.05 mAh/cm$^2$, greater than or equal to 0.1 mAh/cm$^2$, greater than or equal to 0.2 mAh/cm$^2$, greater than or equal to 0.5 mAh/cm$^2$, greater than or equal to 0.7 mAh/cm$^2$, or greater than or equal to 1.0 mAh/cm$^2$. In some embodiments, the areal capacity of an electrode is less than or equal to 1.0 mAh/cm$^2$, less than or equal to 0.7 mAh/cm$^2$, less than or equal to 0.5 mAh/cm$^2$, less than or equal to 0.3 mAh/cm$^2$, less than or equal to 0.2 mAh/cm$^2$, less than or equal to 0.1 mAh/cm$^2$, less than or equal to 0.05 mAh/cm$^2$, or less than or equal to 0.01 mAh/cm$^2$. Combinations of the foregoing ranges are also contemplated (e.g., greater than or equal to 0.01 mAh/cm$^2$ and less than or equal to 1.0 mAh/cm$^2$). Other ranges are possible.

The electrolyte may comprise a solvent (i.e., an electrolyte solvent) to dissolve one or more compounds, such as an electrolyte salt (e.g., an electroactive species and a counterion of the electroactive species). Many electrolyte solvents are known in the art. The solvent may be an aqueous solvent or a non-aqueous solvent. Examples of useful non-aqueous solvents (i.e., non-aqueous liquid electrolyte solvents) include, but are not limited to, N-methyl acetamide, acetonitrile, acetals, ketals, esters (e.g., esters of carbonic acid, sulfonic acid, an/or phosphoric acid), carbonates (e.g., dimethyl carbonate, diethyl carbonate, ethyl methyl carbonate, propylene carbonate, ethylene carbonate, fluoroethylene carbonate, difluoroethylene carbonate), vinylene carbonate, sulfones, sulfites, sulfolanes, suflonimidies (e.g., bis(trifluoromethane) sulfonimide lithium salt), ethers (e.g., aliphatic ethers, acyclic ethers, cyclic ethers), glymes, polyethers, phosphate esters (e.g., hexafluorophosphate), siloxanes, dioxolanes, N-alkylpyrrolidones (e.g., N-methyl-2-pyrrolidone), nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Other electrolyte solvents are possible as this disclosure is not so limited. In some embodiments, mixtures or combinations of the foregoing are possible. For example, in some embodiments, the single electrolyte comprises ethylene carbonate, ethyl methyl carbonate, and/or vinylene carbonate.

The electrolyte may comprise a compound or salt to provide ion conductivity to the electrochemical cell. In some embodiments, an electroactive species may be present within the electrolyte as an ionic electrolyte salt. Non-limiting examples of electrolyte salts for use in the electrolyte of the electrochemical cells described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI). In some embodiments, the single electrolyte comprises lithium hexafluorophosphate.

The electrolyte may have a particular concentration (e.g., an initial concentration) of a compound or salt (e.g., an electrolyte salt). For example, in some embodiments, the electrolyte has an initial electrolyte concentration of greater than or equal to 10 mM and/or less than or equal to 5 M. In some embodiments, the concentration of the electrolyte is greater than or equal to 10 mM, greater than or equal to 25 mM, greater than or equal to 50 mM, greater than or equal to 100 mM, greater than or equal to 250 mM, greater than or equal to 500 mM, or greater than or equal to 750 mM. In some embodiments, the concentration of the electrolyte is less than or equal to 750 mM, less than or equal to 500 mM, less than or equal to 250 mM, less than or equal to 100 mM, less than or equal to 50 mM, less than or equal to 25 mM, or less than or equal to 10 mM. In some embodiments, the concentration of the electrolyte is greater or equal to 1 M, greater than or equal to 2 M, greater than or equal to 3 M, greater than or equal to 4 M, or greater than or equal to 5 M. In some embodiments, the concentration of the electrolyte is less than or equal to 5 M, less than or equal to 4 M, less than or equal to 3 M, less than or equal to 2 M, or less than or equal to 1 M. Combinations of the above-referenced ranges are also possible (e.g., greater than or equal to 10 mM and less than or equal to 5 M). Other ranges are possible.

The electrolyte may have a certain transference number. As understood by those skilled in the art, the portion of an applied current carried by an electroactive species (e.g., Li$^+$, a counterion of the electroactive species). The transference number is customarily represented by the symbol t$_+$ or t$_-$, depending on the charge of the species and sum of the transference number is 1 for a particular electroactive species and its corresponding counterion. In some embodiments, the transference number of the electroactive species (e.g., a positively charged electroactive species, such as Li$^+$) is greater than or equal to 0.1, 0.2, 0.3, 0.4, or 0.5. In some embodiments, the transference number of the electroactive species is less than or equal to 0.5, 0.4, 0.2, 0.3, 0.2, or 0.1. Combinations of the foregoing ranges are also contemplated (e.g., greater than 0.1 and less than 0.5). Of course, other ranges are possible as this disclosure is not so limited.

In some embodiments, the systems and methods comprise a tank. The tank may be adapted and arranged to contain the liquid electrolyte and to allow for convection of the liquid electrolyte. Many suitable containers exist, and can be a tank, a vessel, a reservoir, or the like. In some embodiments, the tank holds a single electrolyte. The tank may be connected to other portions of the system (e.g., the electrochemical cell, the pump, an electrode) via one or more conduits, channels, or tubing.

As mentioned above, a pump may be used to flow or otherwise provide convection to an electrolyte within an electrochemical cell. However, it should also be understood that convection may be provided without a pump, or in combination with the pump, using other techniques, such as a stir bar, stir plate, a scintillator, a sonicator, vortex mixer, and/or a membrane (e.g., the deflection of a membrane), without limitation.

The pump may be configured to provide a particular flow rate. For example, in some embodiments, the pump is configured to provide an average flow rate to the electrolyte of greater than or equal to 0.5 µm/s or greater than or equal to 2.1 µm/s. In some embodiments, the pump is configured to provide an average flow to the electrolyte of greater than or equal to 0.001 µm/s, 0.01 µm/s, 0.1 µm/s, 0.5 µm/s, greater than or equal to 1 µm/s, greater than or equal to 10 µm/s, greater than or equal to 25 µm/s, greater than or equal to 50 µm/s, greater than or equal to 100 µm/s, greater than or equal to 500 µm/s, greater than or equal to 1,000 µm/s, greater than or equal to 2,500 µm/s, greater than or equal to 5,000 µm/s, or greater than or equal to 10,000 µm/s. In some embodiments, the pump is configured to provide an average flow rate to the electrolyte of less than or equal to 10,000 µm/s, less than or equal to 5,000 µm/s, less than or equal to 2,500 µm/s, less than or equal to 1,000 µm/s, less than or equal to 500 µm/s, less than or equal to 100 µm/s, less than or equal to 50 µm/s, less than or equal to 25 µm/s, less than or equal to 10 µm/s, less than or equal to 1 µm/s, less than or equal to 0.5 µm/s, less than or equal to 0.1 µm/s, less than or equal to 0.01 µm/s, or less than or equal to 0.001 µm/s. Combinations of the above-referenced ranges are also possible (e.g., greater than or equal to 0.001 µm/s and less than or equal to 10,000 µm/s). The electrolyte may also have an average velocity of or within any of the above-referenced ranges.

The convection-enhanced systems and methods described herein may be used in a variety of applications. In some cases, the convection-enhanced systems and methods may be particularly suitable in scenarios where a high rate or fast discharge/charge are desired over a substantial portion of use. For example, advantageous uses can be vehicles (both manned and unmanned), such as, hybrid and electric automobiles (including cars, trucks, buses, scooters, motorcycles), aircraft, aquatic vessels (including ships, boats, and jet skis), bicycles; storage and load leveling systems in combination with variable renewable energy technologies, such as, photovoltaic cells; wind turbines, and wave and tidal energy capture devices; storage and load leveling of grid electricity; power tools and outdoor equipment, such as lawnmowers; remote field energy storage and use (e.g. power packs for military, outdoor recreational purposes); industrial or municipal uses, such as, forklifts; construction equipment, such as heavy earth-moving machinery; personal mobility devices, such as, wheelchairs, golf carts, and go-karts; and indoor appliances, such as, vacuum cleaners, without limitation. Of course, many other applications are possible in scenarios that require electrical power on demand.

Convection has been shown to provide performance improvements in convention enhanced energy storage systems where the electrochemical cell has large γ and β values, as described in Appendices I and II, which has high transport resistance from diffusion and there is limited salt in the electrolyte solution to compensate. Some examples include where the electrochemical cell has high applied current density, low electrode porosity, low Li+ transference number, or active materials with high specific capacity A convection-enhanced energy storage system, includes an electrochemical cell comprising a positive electrode, a separator, and a negative electrode, a tank holding an electrolyte, the electrolyte also further circulated through the electrochemical cell, and a pump connected to the electrochemical cell and the tank to circulate the electrolyte. In some implementations, the electrochemical cell has large $\gamma$ and $\beta$ values, which has high transport resistance from diffusion and there is limited salt in the electrolyte solution to compensate. In some implementations, the electrochemical cell has high applied current density. In some implementations, the electrochemical cell has low electrode porosity. In some implementations, the electrochemical cell has low Li+ transference number. In some implementations, the electrochemical cell has active materials with high specific capacity.

A computer system can implement a model of a convection enhanced energy storage system, for example for simulation to select parameters for such an energy storage system. Such a simulation can be implemented on a general purpose computer as described in connection with FIG. 2 below, according to the example implementation described in Examples 1 and 2. The model includes one or more of the following: a convection term in a Nernst-Planck equation representing the convection enhanced energy storage system; boundary conditions of a cell of the convection enhanced energy storage system to account for forced convection at boundaries; gauging conservation of anions within an external tank; and calculating electrode active area as a function of porosity.

An example implementation is described in Examples 1 and Example 2, which is hereby incorporated by reference.

The literature listed in Example 1 and Example 2 forms a part of this Specification, and the literature is incorporated by reference herein.

Figure 2:
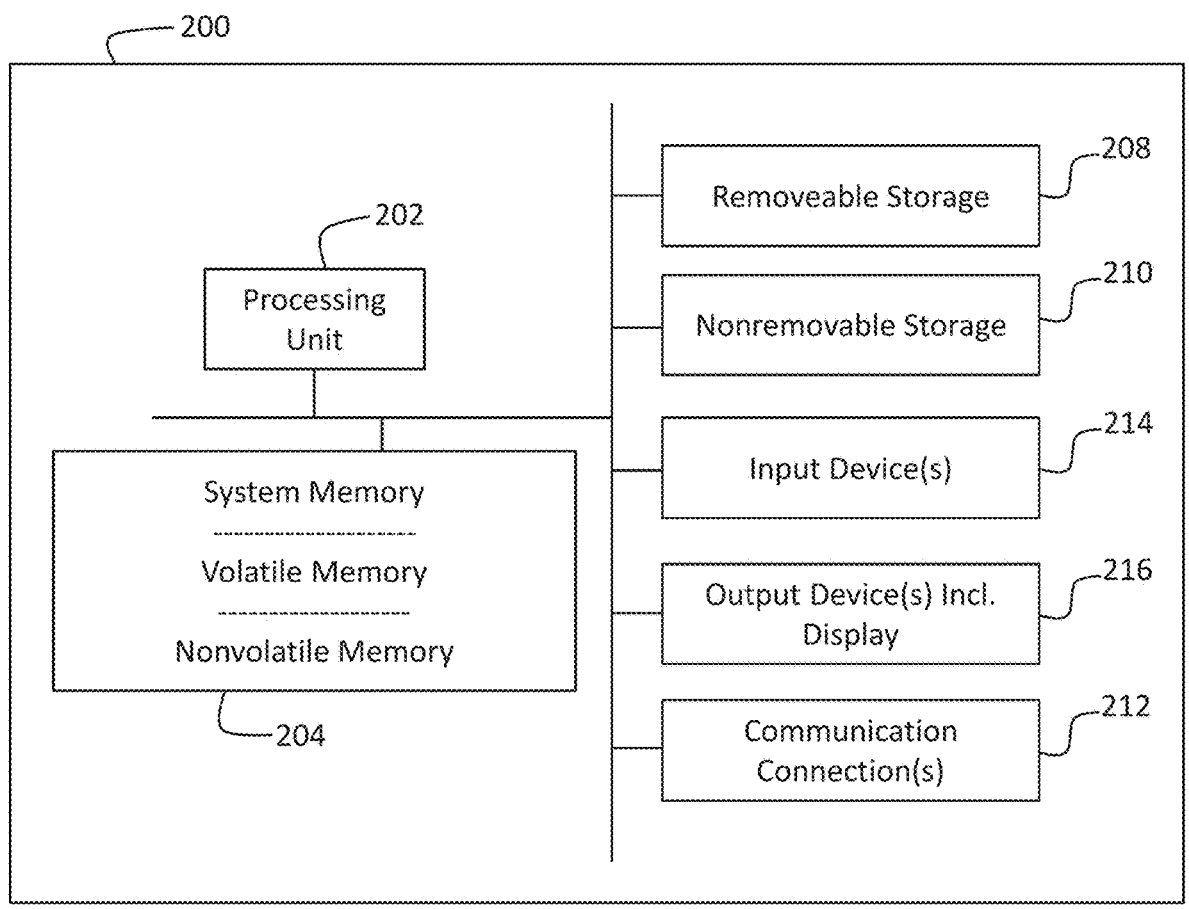
FIG. 2 is block diagram of an example general purpose computer

Having now described an example implementation, FIG. 2 illustrates an example of a general-purpose computing device with which can be used to implement the modeling as described herein. This is only one example of a computing device and is not intended to suggest any limitation as to the scope of use or functionality of such a computing device. The computer system described above can be implemented in one or more computer programs executed on one or more such computing device, such as a general-purpose computer as shown in FIG. 2.

FIG. 2 is a block diagram of a general-purpose computer which processes computer program code using a processing system. Computer programs on a general-purpose computer typically include an operating system and applications. The operating system is a computer program running on the computer that manages and controls access to various resources of the computer by the applications and by the operating system, including controlling execution and scheduling of computer programs. The various resources typically include memory, storage, communication interfaces, input devices, and output devices. Management of such resources by the operating system typically includes processing inputs from those resources, scheduling use of those resources, and providing outputs from those resources.

Examples of such general-purpose computers include, but are not limited to, larger computer systems such as server computers, database computers, desktop computers, laptop and notebook computers, as well as mobile or handheld computing devices, such as a tablet computer, handheld computer, smart phone, media player, personal data assistant, audio or video recorder, or wearable computing device.

With reference to FIG. 2, an example computer 200 comprises a processing system including at least one processing unit 202, also called a processing device, and a memory 204. The computer can have multiple processing units 202 and multiple devices implementing the memory 204. A processing unit 202 can include one or more processing cores (not shown) that operate independently of each other. Additional co-processing units, such as graphics processing unit 220, also can be present in the computer. The memory 204 may include volatile devices (such as dynamic random access memory (DRAM) or other random access memory device), and non-volatile devices (such as a read-only memory, flash memory, and the like) or some combination of the two, and optionally including any memory available in a processing unit. Other memory such as dedicated memory or registers also can reside in a processing unit. This configuration of memory is illustrated in FIG. 2 by line 204. The computer 200 may include additional computer storage (removable or non-removable) including, but not limited to, magnetically recorded or optically recorded disks or tape. Such additional computer storage is illustrated in FIG. 2 by removable storage 208 and non-removable storage 210. The various components in FIG. 2 typically are interconnected by an interconnection mechanism, such as one or more buses 230.

A computer storage medium is any medium in which data can be stored in and retrieved from addressable physical storage locations by the computer. Computer storage media includes volatile and nonvolatile memory devices, and removable and non-removable storage devices. Memory 204, removable storage 208 and non-removable storage 210 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 200 may also include communications connection(s) 212 that allow the computer to communicate with other devices over a communication medium. Communication media typically transmit computer program code, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 212 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 200 may have various input device(s) 214 such as various pointer (whether single pointer or multi-pointer) devices, such as a mouse, tablet and pen, touchpad and other touch-based input devices, stylus, image input devices, such as still and motion cameras, audio input devices, such as a microphone. The computer may have various output device(s) 216 such as a display, speakers, printers, and so on, also may be included. These devices are well known in the art and need not be discussed at length here.

The various storage 210, communication connections 212, output devices 216 and input devices 214 can be integrated within a housing of the computer or can be connected through various input/output interface devices on the computer, in which case the reference numbers 210, 212, 214 and 216 can indicate either the interface for connection to a device or the device itself as the case may be.

An operating system of the computer typically includes computer programs, commonly called drivers, which manage access to the various storage 210, communication connections 212, output devices 216 and input devices 214. Such access can include managing inputs from and outputs to these devices. In the case of communication connections, the operating system also may include one or more computer programs for implementing communication protocols used to communicate information between computers and devices through the communication connections 212.

Each component (which also may be called a "module" or "engine" or the like), of a computer system and which operates on one or more computers, can be implemented as computer program code processed by the processing system(s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated, and stored by a processing system of a computer.

In some embodiments, a convection enhanced energy storage system is described, the system comprising an electrochemical cell comprising a positive electrode, a separator, and a negative electrode; a tank holding an electrolyte, the electrolyte also further circulated through the electrochemical cell; and a pump connected to the electrochemical cell and the tank to circulate the electrolyte. In some embodiments, the convection enhanced energy storage system has parameters determined using a computer system as described above. In some embodiments, the convection enhanced energy storage system has large $\gamma$ and $\beta$ values, which has high transport resistance from diffusion and there is limited salt in the electrolyte solution to compensate. In some embodiments, the convention enhanced energy storage system has high applied current density, low electrode porosity, low Li+ transference number, and active materials with high specific capacity.

In some embodiments, a computer system comprising a processing system is described including a processing unit and computer storage, the processing system processing computer program instructions to implement a model of a convection enhanced energy storage system. In some embodiments, the computer system has a model that includes a convection term in a Nernst-Planck equation representing the convection enhanced energy storage system. In some embodiments, a computer system is described, wherein the model has boundary conditions that represent allow for electrolyte flow into and out of a cell of the convection enhanced energy storage system. In some embodiments, a computer system is described, wherein the model includes a representation of an electrolyte tank. In some embodiments, a computer system is described, wherein the model has boundary conditions of a cell of the convection enhanced energy storage system to account for forced convection at boundaries. In some embodiments, a computer system is described, wherein the model includes instructions that gauge conservation of anions within an external tank. In some embodiments, a computer system is described, wherein the model includes instructions to calculate electrode active area as a function of porosity. In some embodiments, a computer system is described, wherein the model determines cell performance by simulation of individual discharge curves as a function of electrolyte properties and flow rate, electrode properties and dimensions, and applied current. In some embodiments, a computer system is described, wherein the model combines physical quantities into dimensionless groups.

The following examples are intended to illustrate certain embodiments of the present invention, but do not exemplify the full scope of the invention.

Example 1

The following example describes modeling and simulation data of electrochemical cells in which a physical description of convection has been added to the conventional model of an electrochemical. An emphasis on the physical parameters of most important to improved electrochemical cell performance is provided, which may inform the fabrication of electrochemical cells that include convection of the electrolyte.

Performance and cost requirements for emerging storage applications present challenges to existing battery technologies and call for substantial improvements in cell energy and rate capability. Convection batteries can reduce mass transport limitations commonly observed during high current operation or with thick electrodes. In prior proof-of-concept work, while convection was shown to improve cell performance, its effectiveness was limited in the select cases studied. To understand the feasibility of the convection battery more comprehensively, we develop a mathematical model to describe convection in a Li-ion cell and evaluate performance as a function of a broad range of cell dimensions, component properties, as well as electrochemical and flow rate operating conditions. Qualitatively, it was found that electrolyte flow enhances accessible capacity for cells with large electrolyte diffusive transport resistance and low initial amounts of electrolyte salt by reducing spatial concentration gradients allowing for efficient high current operation. Quantitatively, by leveraging dimensional analysis that lumps >10 physical and cell parameters into representative dimensionless groups, the efficacy, trade-offs, and upper performance bounds of convection in a cell were determined. This analyses suggest that this format has the potential to enable high-power, energy-dense storage which, in turn, may offer new application spaces for existing and emerging intercalation chemistries.

Introduction

Ubiquitous in portable electronics and emergent in transportation and stationary applications, lithium (Li)-ion batteries arguably represent the state-of-the-art in electrochemical energy storage technology owing to their energy density, roundtrip efficiency, and cycle life. While the past decade has seen a steady decline in battery price and concomitant increase in energy density due to a combination of materials development, manufacturing advances, and market scale, current Li-ion batteries are challenged by the often incongruous requirements of emerging applications. Of particular note is the need for rechargeable batteries with both high power and high energy density at a reasonable cost. In the current cell format, sustained high power is frequently limited by diffusive transport losses, which necessitate the use of thin electrodes and separators. This, in turn, leads to inactive components occupying a substantial fraction of the battery weight and volume, leading to higher subsequent energy storage costs.

Figure 3A:
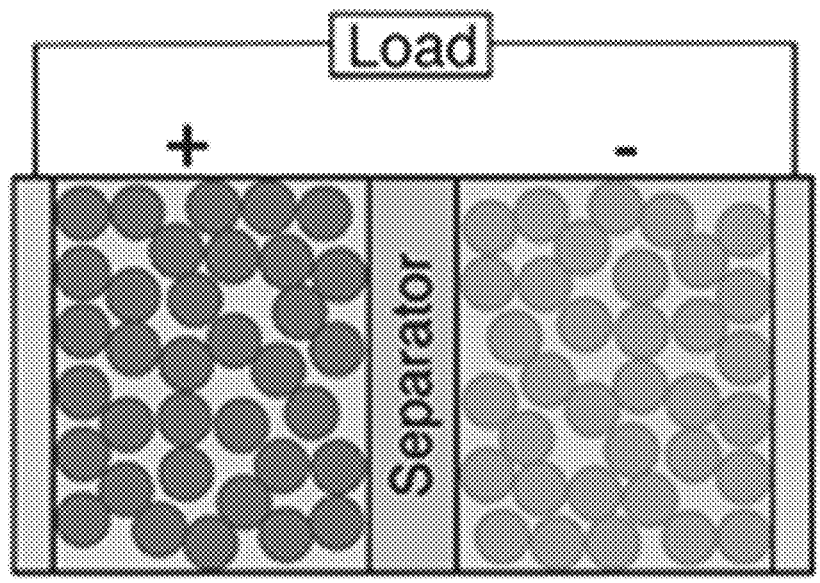
FIG. 3A shows intercalation battery configurations with an enclosed cell design as is typical in most modern devices, according to one example.
Figure 3B:
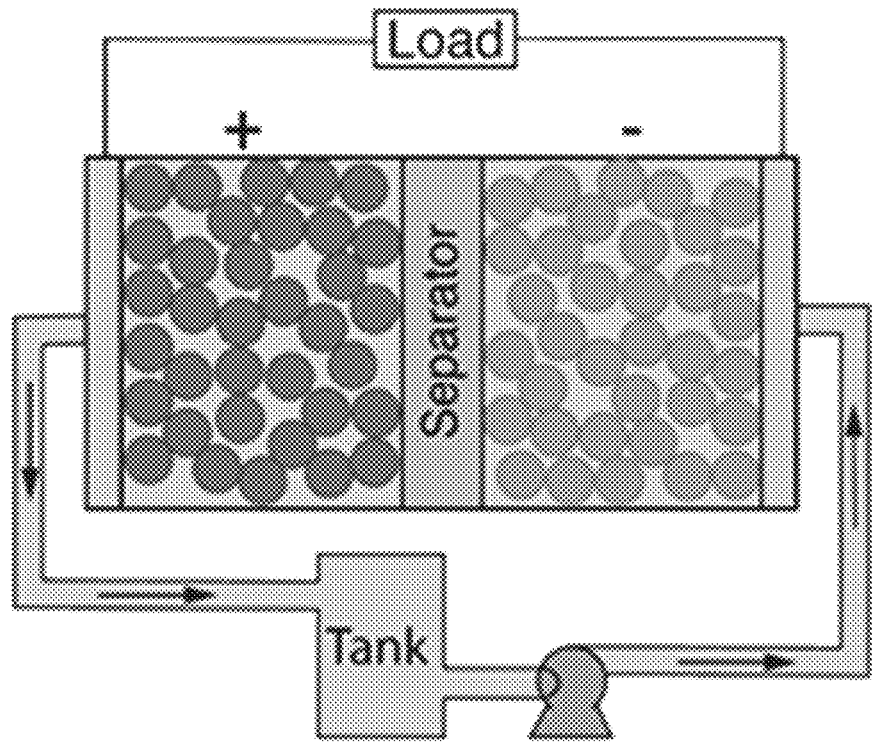
FIG. 3B shows an intercalation battery configuration with flow-through convection design that attempts to improve transport in the electrolyte where the additional hardware required consists of an external storage tank and pump to provide forced convection through the porous intercalation materials and separators that compose the battery cell, according to some embodiments.

Most current research efforts focus on achieving performance improvements through material innovations including electrolyte formulations with reduced viscosity, increased conductivity, and high Li+ transference numbers; charge-storage materials with surface coatings or structuring to enhance intercalation rates; cell chemistries with higher energy density due to increased capacity and/or voltage; and electrode microstructures with reduced tortuosity and increased pore connectivity. In contrast, few have contemplated cell engineering as a means of unlocking new pathways to performance and cost targets. One potentially promising approach is the convection battery, in which electrolyte is circulated through the device to overcome mass transport limitations (FIG. 3B). Forced convection enables a more uniform electrolyte concentration throughout the cell, in principle allowing for the use of thicker electrodes or operation at high currents while maintaining high accessed capacity. Compared to the traditional sealed cell configuration (FIG. 3A), the convection format can offer several advantages including (1) electrodes with an increased and controllable ion flux, (2) improved safety and maintenance, (3) simplified manufacturing, and, ultimately, (4) reduced system costs. Suppes and co-workers demonstrated proof-of-concept convection cells, in a packed bed configuration, for both aqueous (Zn—$MnO_2$) and non-aqueous (C—$LiFePO_4$) chemistries. Notably, for the C—$LiFePO_4$ cell, which contained 6-mm-thick particle-bed-type electrodes, the authors observed an increase in accessed capacity from 10% to 25% for cells with stagnant and flowing electrolyte, respectively. While these experimental studies established that convection could improve cell performance, the prototype cell capacities were low, suggesting there are limits to this approach. To explain the impact of convection, Suppes and co-workers developed a simple electrolyte transport model that showed increasing superficial velocity reduced spatial concentration gradients within the cell thereby increasing the limiting current density and energy efficiency. These findings were further supported by theoretical analysis of electrolyte transport through a porous separator by Kim and Monroe. While this works serves an important role in demonstrating convection-enhanced intercalation batteries, the results are limited to just several cases of cell size, flow velocity, and operating current.

The past literature leaves key unanswered questions about the potential benefits of convection batteries in terms of ranges of geometric, physical, and operating parameters. It is critical to understand (1) the combinations of parameters that yield enhancement in convection battery performance relative to closed cells with no convection, (2) the upper limits to any enhancement, and (3) the transition behavior and output between the upper limits and corresponding closed cell cases. The intertwined nature of relationships between cell thickness, electrolyte flow rate, transport properties, and operating current and the resultant polarization, power output, and accessed capacity of the cell are unclear. Furthermore, there is no prior substantial body of results to understanding these relationships. To this end, a Li-ion electrochemical model was refined, a systematic study using a range of parameters, and a comprehensive representations of cell performance as a function of these parameters is presented. In doing so, the key scaling relationships are described and dimensionless groups that describe the conditional efficacy of convection batteries and introduced.

Despite a paucity of convection battery models beyond the works described above, there is a rich history of mathematical modeling in Li-ion batteries. Arguably the most widely used approach is the porous-electrode theory based pseudo-two-dimensional (P2D) model originally developed by Newman and co-workers. The model describes thermodynamics, electrochemistry, and transport phenomena in the cell via a set of tightly coupled partial differential-algebraic equations (PDAEs) with variations in cell length (x), active material particle radius (r), and time (t). This model has since been reformulated using different numerical techniques and implemented in programs such as DUALFOIL, COMSOL, and Battery Design Studio. More recently, Braatz and co-workers translated this model to MATLAB to increase usability and have since termed their updated model the Li-ION SIMulation BAttery Toolbox (LIONSIMBA). Here, this pre-existing framework is leveraged and extended to describe convection in Li-ion cells.

In this example, comprehensive insight was sought and provided into the impact of convection on the cell-level performance of Li-ion batteries. Specifically, the LIONSIMBA software was modified to incorporate a convection term in the Nernst-Planck equation, amend the boundary conditions to allow for electrolyte flow into and out of the cell, and introduce an electrolyte tank. The new open-source package, LIONSIMBA+c, is first validated against the original software and then used to generate more than 50,000 battery discharge curves as a function of cell dimensions, electrode, electrolyte, and separator properties, as well as electrochemical and fluid dynamic operating conditions. Through dimensional analysis, this simulation-based data set can be described compactly through relative scales of dimensionless groups, which both reveal cell-level performance trade-offs and indicate regions where convection is an effective means of boosting performance. While the focus was on only on cell-level performance enhancement and did not include discussion on system-level designs and trade-offs, it was anticipated that the insights provided by this example will inform future cell engineering campaigns and may inspire further investigation of convection-enhanced energy storage systems.

Model Development

As discussed above, LIONSIMBA had been previously validated against COMSOL MultiPhysics commercial software39 and Newman's Fortran DUALFOIL35 simulations to demonstrate the accuracy of its predictions to Li-ion battery operation. LIONSIMBA uses a P2D model34 to generate a set of PDAEs by assuming that the cell is perfectly mixed radially, but may contain spatial temperature, concentration, or potential gradients in the axial dimension. The set of PDAEs is subsequently reformulated into ordinary differential-algebraic equations (DAEs) using finite volume method (FVM) by partitioning the spatial domain into discrete volumes or cells, each with constant properties due to the assumption of being perfectly mixed and approximating the fluxes through the surfaces of these cells and the rate of generation within in terms of the volume averages. Through the FVM formulation, as opposed to a finite difference solution, boundary conditions involving a specified external flux may be treated exactly, rather than as an approximation. This system of equations is solved numerically using the IDA solver produced by Lawrence Livermore National Laboratory, which uses a variable-order, variable-coefficient backwards differentiation formula. To enable the desired extensions to LIONSIMBA, we needed to make the changes described in greater detail in the following paragraphs: (1) introduce the convection term to the Nernst-Planck equation, (2) modify the boundary conditions to the cell to account for forced convection at the boundaries, (3) gauge the conservation of anions within the external tank, and (4) calculate the electrode active area as a function of its porosity.

The convective flux term of the Nernst-Planck equation originally excluded from LIONSIMBA is necessary to model electrolyte forced through the intercalation cell by an external pump. Although the heat transfer equations were also modified to account for electrolyte flow, for the remainder of this example assumes isothermal operation to limit the focus to the connection between mass transfer and cell performance. The effects of heat-transfer and the possibility for the use of convection to limit thermal excursions are beyond the scope of this initial study but are contemplated in future work. Eq. (1) shows the modified species conservation equation which includes the convective transport term.

$$\varepsilon_i \frac{\partial c_e(x,t)}{\partial t} = \frac{\partial}{\partial x}\left[D_{eff,i}\frac{\partial c_e(x,t)}{\partial x}\right] - v\frac{\partial c_e(x,t)}{\partial x} + \begin{cases} a_i(1-t_+)j(x,t) & \text{if } i \in \{p,n\} \\ 0 & \text{if } i \in \{s\} \end{cases} \quad (1)$$

Here $\varepsilon_i$ is the fractional porosity of domain i, where i∈ {p, s, n} indicates the positive electrode (p), separator(s), or negative electrode (n) respectively, $c_e$ (x,t) is the anion concentration, which is equivalent to the cation concentration via the assumption of bulk electroneutrality, at position x and time t, $D_{eff,i}$ is the effective diffusion coefficient, v is electrolyte superficial velocity through the cell, which is constant by the assumption of constant fluid density within the cell, $a_i$ is the total particle surface area per unit volume of the electrode, $t_+$ is the Li$^+$ transference number, and j(x,t) is the ionic flux averaged over the interfacial area between the matrix and the pore solution. To avoid undue complication to the analyses, axial dispersion due to velocity variation in transverse directions was neglected. Based on estimations using Sherwood et al. for porous media flow, this neglect is reasonable at the typical low velocities used in the model. For the fraction of high velocity cases, convection in the primary flow direction already dominates transport and causes spatial uniformity in concentration. Hence, the axial dispersion from convective spreading only slightly enhanced performance beyond the results of the present study. Another acceptable model approximation is the theory of dilute solutions rather than concentrated solutions. Although dilute solution treatment overlooks some effects, such as slight variations in density and velocity, importantly, the approach is particularly appropriate for major objectives of the work. In the identified upper limits of convection cell performance at high flow rates, concentrations remain relatively uniform and near inlet values. Then, to explain conditional convection cell performance enhancement, dilute solution theory enables the model to capture the trends and competition of transport modes.

Figure 4:
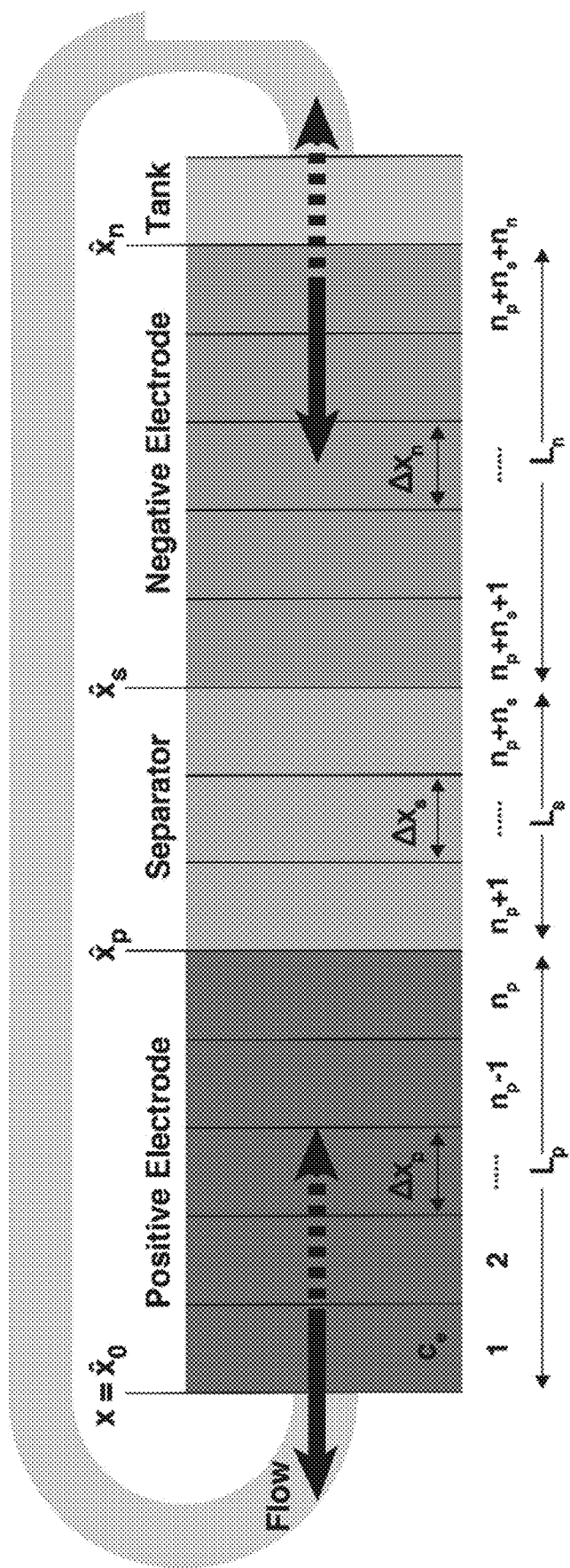
FIG. 4 shows the finite volume discretization and domain used for simulations of the convection battery in the LIONSIMBA+c model with the nodes numbered from the left, starting at $x=\hat{x}_0$ for the left boundary of N=1 to $x=\hat{x}_n$ for the right boundary of $N=n_p+n_s+n_n$, and the diagram shown above is for the situation of flow from the negative electrode to the positive electrode such that the tank is located at a fictitious node N+1; however, if the flow were reversed, the tank would be located at a fictitious node 0, according to some embodiments.

The boundary conditions can be treated in a similar fashion to the original LIONSIMBA model, such that there is no diffusive flux entering or exiting the cell domain, but, due to forced electrolyte motion, convective fluxes now traverse these boundaries. This can be rationalized by considering a convection battery cell connected to the external tank with tubes that have cross-sectional area significantly smaller than that of the cell, the joints of which are thus dominated by strong convection and the diffusive fluxes are negligible in comparison. The cell boundaries specified by Eq. (1), as visualized in FIG. 4, result in a zero-derivative at the positions x=$\hat{x}_0$=0 and x=$\hat{x}_n$=ΣL$_i$, where ΣL$_i$ is the total thickness of the electrodes and separator.

$$\left.\frac{\partial c_e(x,t)}{\partial x}\right|_{x=\hat{x}_0,\hat{x}_n} = 0 \quad (1)$$

In addition to requiring the inclusion of the convection term, an open system with forced convection from an external holding tank with complete recycling requires a conservation equation on this feed material. By assuming the tank is well mixed, it can be treated as a fictitious node external to the battery cell components. When electrolyte flows from the negative electrode to the positive electrode, a material balance on the tank gives Eq. (2).

$$V_{tank}\frac{dc_{tank}(t)}{dt} = A_{tube}v_{tube}[c_{e,1}(t) - c_{tank}(t)] \quad (2)$$

While the superficial electrolyte velocity in the tubes entering and exiting the tank, $v_{tube}$, is unknown, at steady state and by assuming constant fluid density, the continuity equation simplifies to $A_{tube}v_{tube}=A_{cell}v$, where $A_{cell}$ and $A_{tube}$ are the cross-sectional areas of the battery cell and the tube, respectively. Using this relationship, the unknown tank velocity can be substituted for known values, resulting in Eq. (3), which was used as the modeled conservation equation for anion concentration in the tank, $c_{tank}$, while simultaneously solving for all other concentrations within the battery pack.

$$\frac{dc_{tank}(t)}{dt} = \frac{A_{cell}}{V_{tank}}v[c_{e,1}(t) - c_{tank}(t)] \quad (3)$$

Lastly, whereas the original LIONSIMBA model allowed independent selection of the spherical radius of solid particles, $R_p$, electrode porosity, $\varepsilon$, and volumetric surface area, a, in reality these parameters will be interdependent, in accordance with Eq. (4). As such, this relationship was included in our updated model, to better reflect the physical limitations that are inherent to solid materials.

$$a = \frac{3}{R_p}(1 - \varepsilon - \varepsilon_{filler}) \quad (4)$$

Additionally, while the original LIONSIMBA modeled solid electrolyte conductivity in isothermal operation, it contained relationships for liquid electrolyte conductivity in the non-isothermal case, which was adapted for LIONSIMBA+c by fixing the temperature. Although dilute solution theory would predict correlation between the diffusivity, transference number, and conductivity, in this example these were treated as independent parameters to provide a broad understanding of the device design space without limiting model applicability in concentrated solution conditions or alternate electrolytes.

Given the analytical modifications to the original $n_p$, $n_s$, and $n_n$ control volumes in the positive electrode, separator, and negative electrode, respectively, the finite volume equations for interior points can be determined by assuming that each node is perfectly back-mixed, resulting in the set of equations shown in Eq. (5).

$$\varepsilon_i \frac{dc_{e,k}(t)}{dt} = D_{eff,k+\frac{1}{2}} \frac{[c_{e,k+1}(t) - c_{e,k}(t)]}{\Delta x_i^2} - D_{eff,k-\frac{1}{2}} \frac{[c_{e,k}(t) - c_{e,k-1}(t)]}{\Delta x_i^2} + \quad (5)$$
$$v\frac{[c_{e,k+1}(t) - c_{e,k}(t)]}{\Delta x_i} + \begin{cases} a_i(1-t_+)j_k(t) & \text{if } i \in \{p,n\} \\ 0 & \text{if } i \in \{s\} \end{cases}$$

The convection term was discretized using upwind differencing scheme due to its stability and robust convergence behavior, and its accuracy is adequate for the purpose of this study. Throughout this study, it was assumed that the electrolyte flows from the Li$^+$-generating electrode (negative during discharge; solid arrow in FIG. 4) to the Li$^+$-consuming electrode (positive during discharge) as this minimizes electrolyte salt depletion at low flowrates. In these equations, $\Delta x_i$ is the width of each node in domain i, and k the index of the node being considered. The boundary conditions given by Eq. (1) can similarly be discretized by considering anion conservation within nodes 1 and N assuming perfect mixing, resulting in Eq. (6) and (7) respectively, where $N = n_p + n_s + n_n$.

$$\varepsilon_p \frac{dc_{e,1}(t)}{dt} = \quad (6)$$
$$D_{eff,1.5} \frac{[c_{e,2}(t) - c_{e,1}(t)]}{\Delta x_p^2} + v\frac{[c_{e,2}(t) - c_{e,1}(t)]}{\Delta x_p} + a_p(1-t_+)j_1(t)$$

$$\varepsilon_n \frac{dc_{e,N}(t)}{dt} = \quad (7)$$
$$-D_{eff,N-0.5} \frac{[c_{e,N}(t) - c_{e,N-1}(t)]}{\Delta x_n^2} + v\frac{[c_{tank}(t) - c_{e,N}(t)]}{\Delta x_n} + a_n(1-t_+)j_N(t)$$

Figure 13:
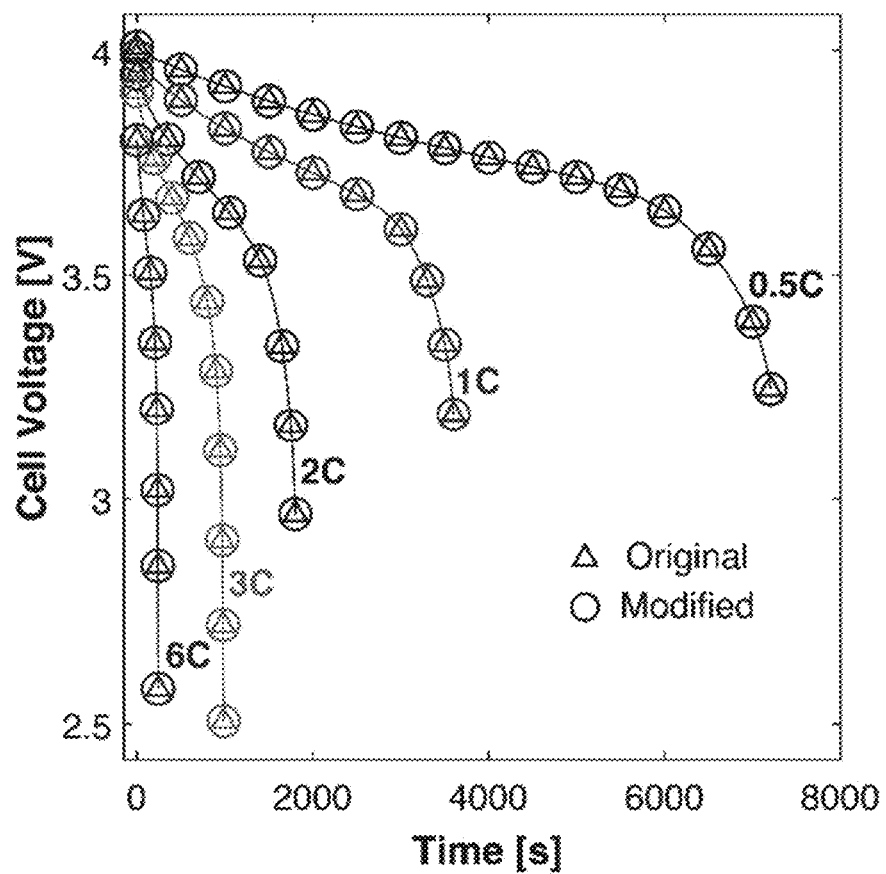
FIG. 13 is a comparison between LIONSIMBA and LIONSIMBA+c model outputs at varying discharge rates with the same inputs and no flow, according to some embodiments.

To ensure that the aforementioned changes made for LIONSIMBA+c did not generate unexpected deviations from the original model, simulated discharge were compared curves using both LIONSIMBA and LIONSIMBA+c with stagnant electrolyte at different C rates, defined as the applied current density normalized by areal capacity. FIG. 13 shows no difference between the model outputs, indicating that the modifications did not introduce artificial changes to the expected behavior.

While the previous sections above described the modifications made to the LIONSIMBA toolkit to create LIONSIMBA+c, the task of effectively sampling the battery operating space to elucidate the regimes in which forced convection may be used to improve battery performance remains daunting given the number of possible engineering variables. To this end, for early investigation not shown, Monte Carlo methods were leveraged, which generate a random battery system with unique electrolyte properties and subsequently examine the impacts of stochastically selected applied current densities and forced flow velocities within the battery. For the plots shown, dimensionless group values were used to generate simulation conditions that uniformly cover the entire space and then back calculate the electrolyte properties, applied current density, and forced flow velocity. FIG. 9 shows the critical parameter value ranges used for this sampling procedure, and the base parameter values selected for any un-sampled values, while FIG. 9 also contains extraneous parameter values needed to repeat these simulations, which are not relevant to further discussion. As it was sought to understand the sensitivity of battery performance to electrolyte transport, a number of galvanostatic simulations in LIONSIMBA+c was performed using the original LIONSIMBA operating state of charge (SoC) range of 85.51% to 0.9% with a lower cutoff voltage of 2.5 V. In each simulation, a cell cross-sectional area of 1 cm$^2$ was used and tank volume of 50 mL, where the tank contains electrolyte identical to that initially in the cell. The higher-order polynomial approximation method provided by the original LIONSIMBA was selected as the solid-phase diffusion model for these simulations (described in more detail in Example 2). In total, about 50,000 data sets were generated with distinct combinations of cell parameters and operating conditions, with each simulation costing about 30 s of wall time.

Figure 5A:
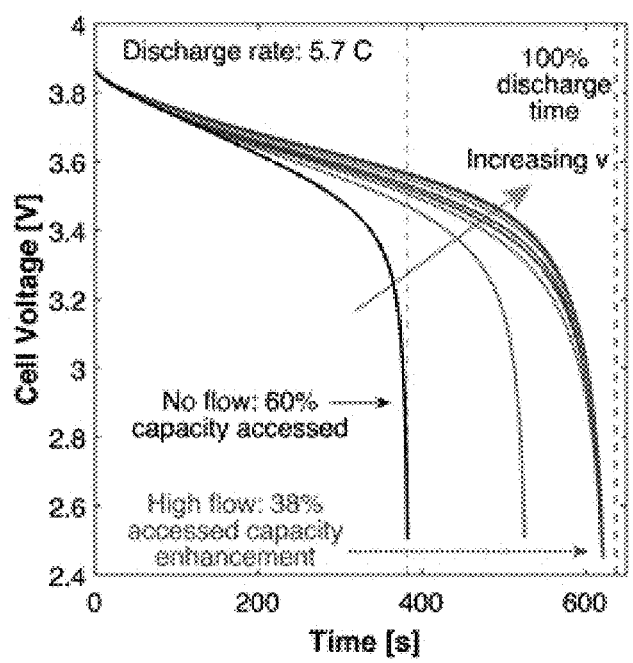
FIG. 5A shows the effect of convective mass transfer on the discharge polarization curve, according to some embodiments.
Figure 5B:
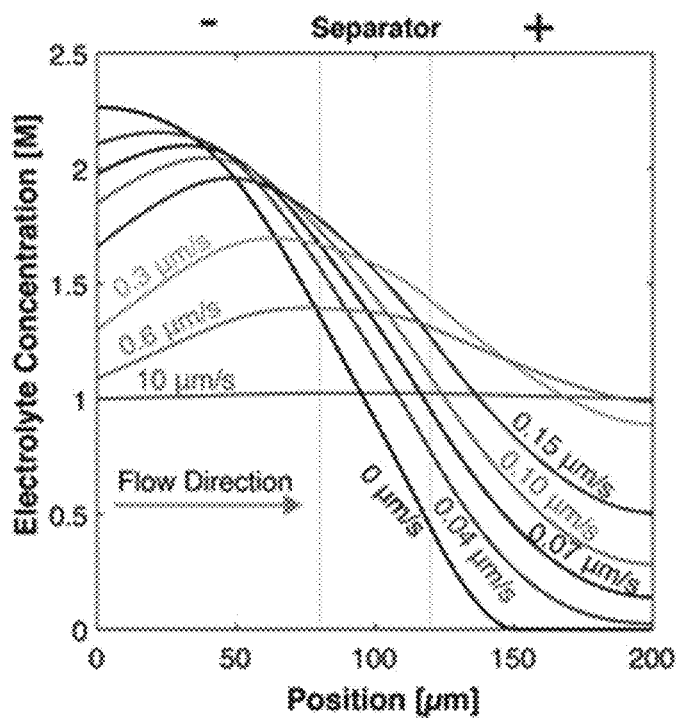
FIG. 5B shows the effect of convective mass transfer on the effect of convective mass transfer on the concentration profile of electrolyte at t=380 s, where it is noted the location of positive and negative electrodes is opposite to that in FIGS. 3-4, and these data show the positive impact of increasing flow rate on cell performance by minimizing the instances of electrolyte salt depletion in the positive electrode, according to some embodiments.

To illustrate the effectiveness of convection-aided intercalation battery operation, a cell shown to access 60% of its theoretical capacity was selected with a stagnant electrolyte (FIG. 5A). The cell intercalation active materials are LiCoO$_2$ in the positive electrode active material and graphite in the negative electrode. By introducing a flowing electrolyte with superficial velocities of 0.04 µm/s and 0.07 µm/s, 83% and 98% of the theoretical capacity could be accessed, respectively, as the electrolyte mass transfer limitations originally occurring within the cell were eliminated. While increasing electrolyte flow rate beyond this point did not impact the accessed capacity, it resulted in greater power- and energy-density as a higher cell voltage was maintained across the discharge profile. FIG. 5B suggests these performance benefits were caused by a smoothing of the concentration profile and was in qualitative agreement with prior models on this topic, while any discrepancies are attributable to differences in cell parameters and operating conditions. Importantly, the cell with a stagnant electrolyte experiences salt depletion in the positive electrode, causing the cell voltage to rapidly approach the cutoff voltage, whereas flowing electrolyte can be used to delay or altogether eliminate salt depletion. However, even when the flowing electrolyte can completely eliminate liquid-phase mass transfer resistances, an inability to access the theoretical capacity would suggest additional battery losses including ohmics, kinetics, or solid-phase mass transfer which cannot be rectified by improved liquid-phase transport (vide infra). Beyond enabling higher accessible capacities, more uniform concentration profiles lead to reduced concentration and activation overpotentials, and increased electrolyte conductivity (FIG. 14), thus the greater power- and energy-density. However, the performance benefits achieved by increasing electrolyte flowrate are anticipated to plateau, resulting in optimal flowrates selected to balance the improvements in electrochemical performance with the increased pumping losses needed to support electrolyte flow. Despite the hypothetical existence of such optima, for the conditions assessed here, the pumping losses through the cell constituted at most 0.006% of the energy gain on a per cell basis (described in more detail in Example 2) and consequently will not be considered further. Through this illustration, improvements in cell performance were rationalized by a flattening concentration profile; however, as FIG. 5 is a limited view of the overall parameter space, further simulations may elucidate the broader trends.

Model Analysis

The development of LIONSIMBA+c enabled assessment of cell performance via the simulation of individual discharge curves as a function of electrolyte properties and flow rate, electrode properties and dimensions, and applied current. With many adjustable and often interdependent system parameters, cell performance can be exhaustively characterized by full parametric sweeps (FIG. 9) over multiple conditions as discussed above. The use of simulations, as opposed to experiments, enabled the rapid identification of performance sensitivities, the evaluation of parameter-dependent tradeoffs, and the estimation of property sets required to achieve performance targets. However, compact and meaningful representation of cell performance as a function of individual variables can be challenging as these outputs are based on coupled reaction and transport processes whose relative importance varies with different scales. Combining physical quantities into dimensionless groups can provide insight on the relative importance of different physical processes within the battery and, in turn, a large number of simulation results can be collapsed into a lower dimensional space. Here, the derivation of relevant dimensionless groups is reported, followed by data analyses using these dimensionless groups.

Because the focus is on the impact of convection on the electrolyte-phase transport during battery operation, it is natural to begin deriving relevant dimensionless groups from electrolyte transport equations. The anion conservation equation, Eq. (1), equates the time rate of change of anion concentration to the divergence of the total anion flux. By electing to non-dimensionalized this equation through the thickness of the positive electrode, L, the full discharge time, $t_{dis}$, applied current density, $I_{app}$, and the initial concentration, $c_{initial}$, the order of magnitude of the resulting terms will be entirely defined by the coefficient groupings as shown in Eq. (8).

$$\frac{c_{initial}\varepsilon_i L}{t_{dis}} \frac{\partial \tilde{c}_e}{\partial \tilde{t}} = -\frac{\partial}{\partial \tilde{x}}\left(-\frac{D_{eff}c_{initial}}{L}\frac{\partial \tilde{c}_e}{\partial \tilde{x}} + vc_{initial}\tilde{c}_e - \frac{1-t_+}{F}I_{app}\tilde{i}_2\right) \quad (8)$$

Based on this dimensionless form of the transport equation, several scales become immediately apparent: (1) electrolyte accumulation/depletion, $c_{initial}\varepsilon_i L t_{dis}^{-1}$; (2) diffusive flux, $D_{eff}c_{initial}L^{-1}$; (3) convective flux, $vc_{initial}$; (4) electromigrative flux, $(1-t_+)I_{app}F^{-1}$. Comparing the relative magnitudes of these fluxes, as shown in FIG. 10, gives insight into the dominant transport phenomena and its relative importance on cell performance in the battery. In comparing the transport phenomena in an enclosed system, the diffusive and electromigrative fluxes, as determined by the dimensionless parameter γ, need to balance to prevent electrolyte salt depletion. A large value of γ indicates an increased likelihood for Li salt depletion in the cathode due to insufficient diffusive transport into the cathode. To include the effects of convection in our analysis, ξ was introduced which is a measure of electromigrative flux compared to the sum of the diffusive and convective fluxes, such that in the absence of convection, ξ=γ. In the same manner, large values of ξ would indicate that the combined diffusive-convective fluxes are slower than the electromigrative flux removing ions from the cathode. Finally, any electrolyte initially present can be used to buffer against electrolyte salt depletion in the cathode, as measured by β, the ratio of electromigration to average flux required for electrolyte salt depletion. Importantly, the exact values of these parameters will change between the positive electrode, negative electrode, and separator. In this example, the dimensionless analyses presented are based on the positive electrode values, as, under the specific conditions contemplated, this is the most likely a source of performance limitations. Note that the set of dimensionless quantities discussed above can also be derived using time constants.

In addition to electrolyte transport limitations, electronic and ionic resistances, solid-phase transport, and kinetics may contribute to lower cell voltages or accessed capacity, and ohmic losses were identified to have the most dominant impacts on our own simulation results. As such, an additional dimensionless group, δ', was included to characterize the ohmic losses of a cell, similar to that defined by Newman and co-workers. For this particular value, the electrolyte conductivity, $\kappa_{eff}$, was calculated using the initial electrolyte concentration in the cell as opposed to the spatiotemporally varying concentration. While the solid-phase transport and kinetics may also limit cell performance, the analysis was focused on electrolyte phase transport limitations, as these other effects constitute minor contributions to performance under the conditions studied.

In this example, simulations were performed with a wide range of input parameter values to identify overarching trends in convection cell performance. While all input parameter values used are grounded in the realm of physical possibility, not all combinations may be practically achievable based on current material sets. Even in such cases, the observations made provide guidance for future research opportunities. Additionally, while this study uses a $LiCoO_2$/graphite redox chemistry, the qualitative understandings of the dimensionless groups gained from this work should be applicable to other battery chemistries. LIONSIMBA can readily be applied to different chemistries and cell formats provided requisite property values are available.

Figure 6:
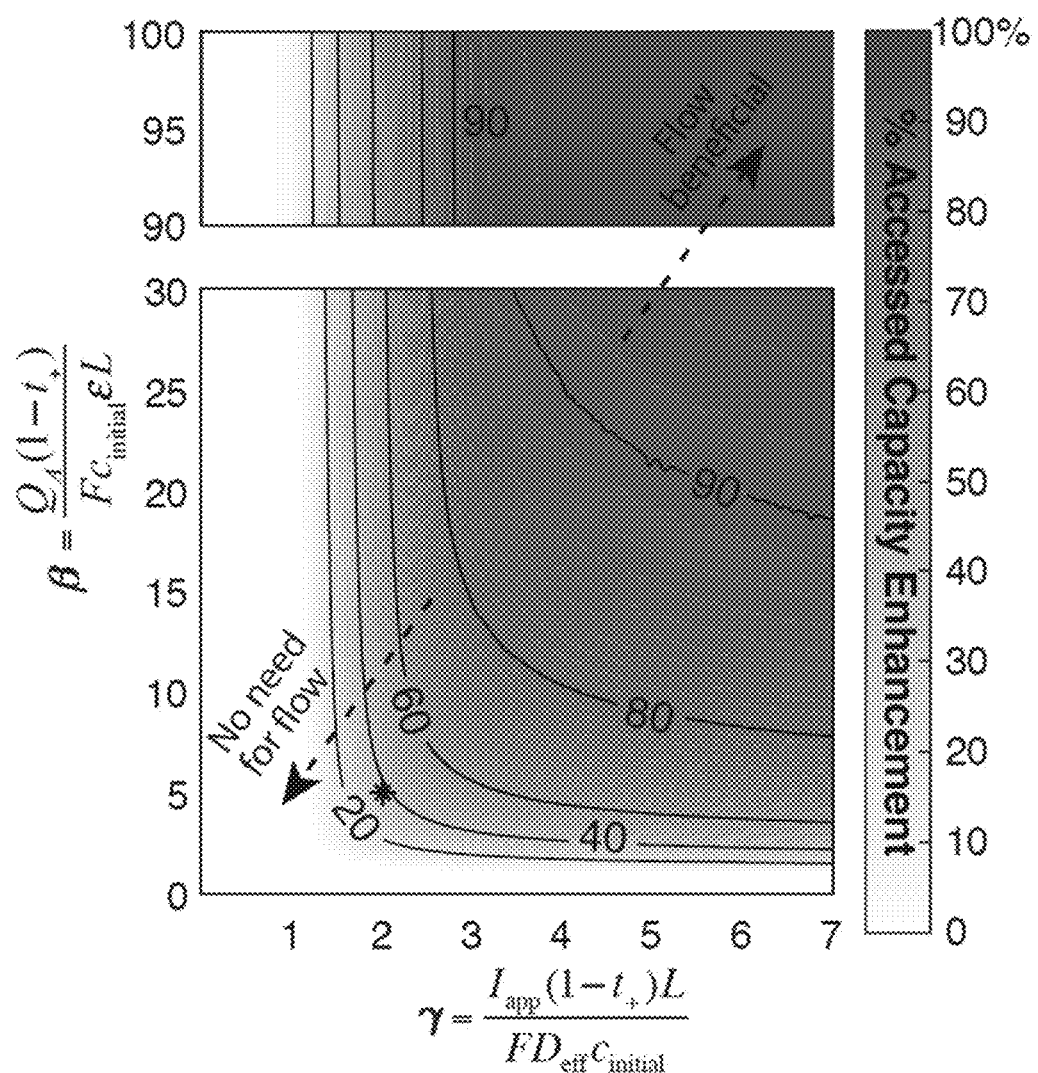
FIG. 6 shows the accessed capacity enhancement by 0.01 m/s of flow compared to a cell without flow, where the figure was generated from 5166 data sets with varying $I_{app}$, $t_+$, D, but same initial electrolyte concentration $c_{initial}$=1000 mol/m³, and constant ohmic resistance, δ'=3.89 corresponding to a dimensional ohmic potential drop of 0.1 V, and a different initial electrolyte concentration will result in similar trends with slight variations in values, as illustrated in FIG. 16, indicates conditions used for the data in FIG. E3, according to some embodiments.
Figure 16:
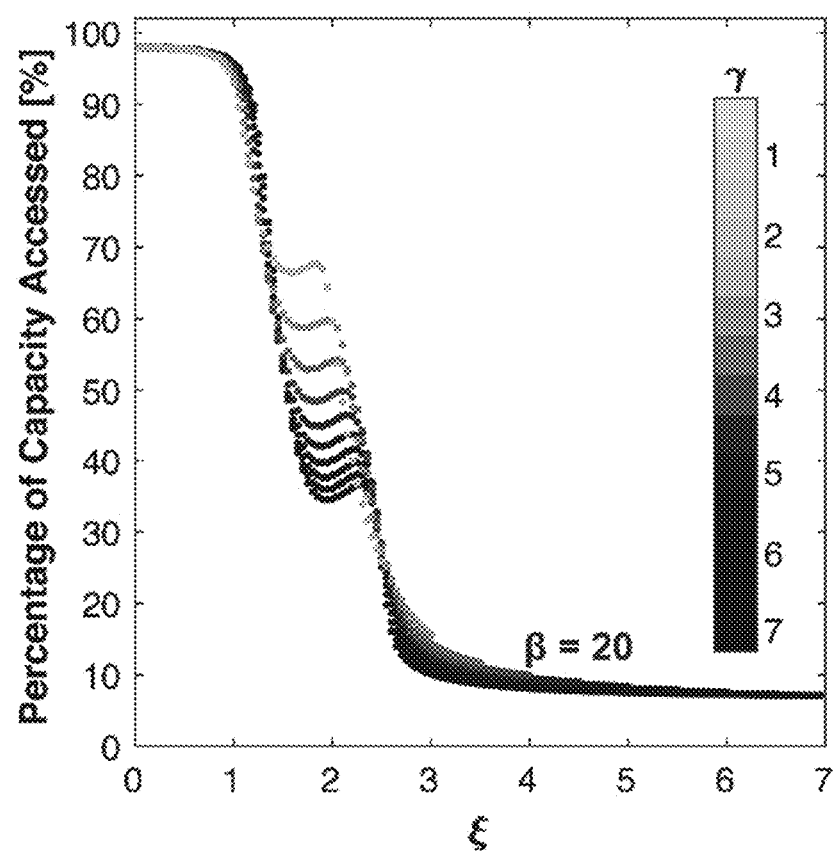
FIG. 16 shows a percentage of capacity accessed as function of & for selected β and γ values, with $c_{initial}$=1.5 M and δ'=3.89, according to some embodiments.

For the remainder of this example, the utility of these dimensionless groups were demonstrated through their ability to predict qualitative model behavior to enhance the field's understanding of the critical points for convective mass transfer used to improve battery performance. In all cases, the accessed capacity of charge stored within the battery was relied upon as the metric of performance, although there are additional performance benefits to convection, because reducing inaccessible capacity is the first step towards improving overall energy density. To begin answering the question of the value of convective transport in an electrochemical cell, a subset of the data of varying both γ and β was examined. Under identical values of γ and β, the capacity accessed in a cell containing a stagnant electrolyte was compared versus a cell with a very high electrolyte velocity of 0.01 m/s ($10^4$ μm/s). Note in FIG. E3, a velocity of just 10 μm/s yielded relatively uniform concentration and transport-optimized performance. The difference between the stagnant and 0.01-m/s capacities was defined as the accessed capacity enhancement, where a positive value indicates that a greater capacity is available when the electrolyte is flowing. The data contained in FIG. 6 show the regions where a flowing electrolyte can greatly improve the accessible capacity only existing in areas where both γ and β are large. Although quantitative differences exist for different initial electrolyte concentrations due to changing kinetic and solid-phase transport resistances, FIG. 16 shows the same qualitative trend as observed here. These trends can be rationalized by returning to the definitions of the dimensionless groups $\gamma$ and $\beta$, where $\gamma$ is the ratio of electromigration to diffusion, and $\beta$ is the ratio of electromigration to the total flux that would cause electrolyte salt depletion. From these definitions, a cell with small $\gamma$ has diffusion within the cell capable of balancing electromigration in the opposite direction, making electrolyte salt depletion highly unlikely. In practice, a small $\gamma$ is the result of a thin electrode, an electrolyte with high diffusivity or large $Li^+$ transference number, or a low discharge rate. Similarly, with a small value of $\beta$ in the cathode, the initial amount of salt in the electrolyte is more than can be depleted by the electromigration of ions. For cells with low electrode porosity, small $Li^+$ transference number, or high specific capacity active materials, both $\gamma$ and $\beta$ values are large, suggesting the accessed capacity for these cells can be significantly enhanced by including convective transport as a means of balancing electrolyte mass transfer.

Building on the analysis showing capacity enhancement with extremely high velocity, further analysis can help us to understand the degree to which intermediate flow rates and parameter combinations enable the convection cell to approach the theoretical maximum enhancement. As before, a subset of all collected data, choosing varying $\beta$, as indicated by different discrete colors, $\gamma$, as indicated by the saturation color bar, and $\xi$, as plotted on the abscissa in FIG. 7, was selected to demonstrate any underlying patterns in these parameters' impact on cell performance. In addition to confirming the observations made in FIG. 6, this further analysis shows the clear existence of performance transition regimes where $1 \geq \xi \leq 3$. In this range, electromigration flux roughly balances diffusion and convection fluxes combined. Interestingly, the transition region narrows with increasing $\beta$. This observation can be explained by a greater vulnerability to transport limitations with higher $\beta$ due to decreased initial amount of salt to buffer any transport imbalance between electromigration versus diffusion and convection. By comparing these first two analyses (FIGS. 6-7), there was clear analogy between $\xi$ and $\gamma$ as both parameters represent the ratios of fluxes in opposite directions within the intercalation cell. Interestingly, however, in FIG. 7, there is a broadening of the curves of each color that was otherwise expected to be individual traces collapsing all Pe values, with only $\beta$ and $\xi$ determining the behavior of cells with flowing electrolyte. Instead, the data presented suggested that the diffusional flux scale, $D_{eff} c_{initial} L^{-1}$, and convective flux scale, $vc_{initial}$, of the same magnitude do not counterbalance electromigration equally. A suspected cause is that the scales used to derive the dimensionless numbers are only estimates based on initial conditions and do not capture the dynamic behavior of the cell. When operated at intermediate $\xi$ values, a concentration gradient develops during cell operation, resulting in different magnitudes of diffusion and convection terms in Eq. (1) due to their different dependence on the concentration gradient. This was further supported by the diminution of the broadening at low $\xi$ values when the concentration gradient becomes more uniform.

Figure 8A:
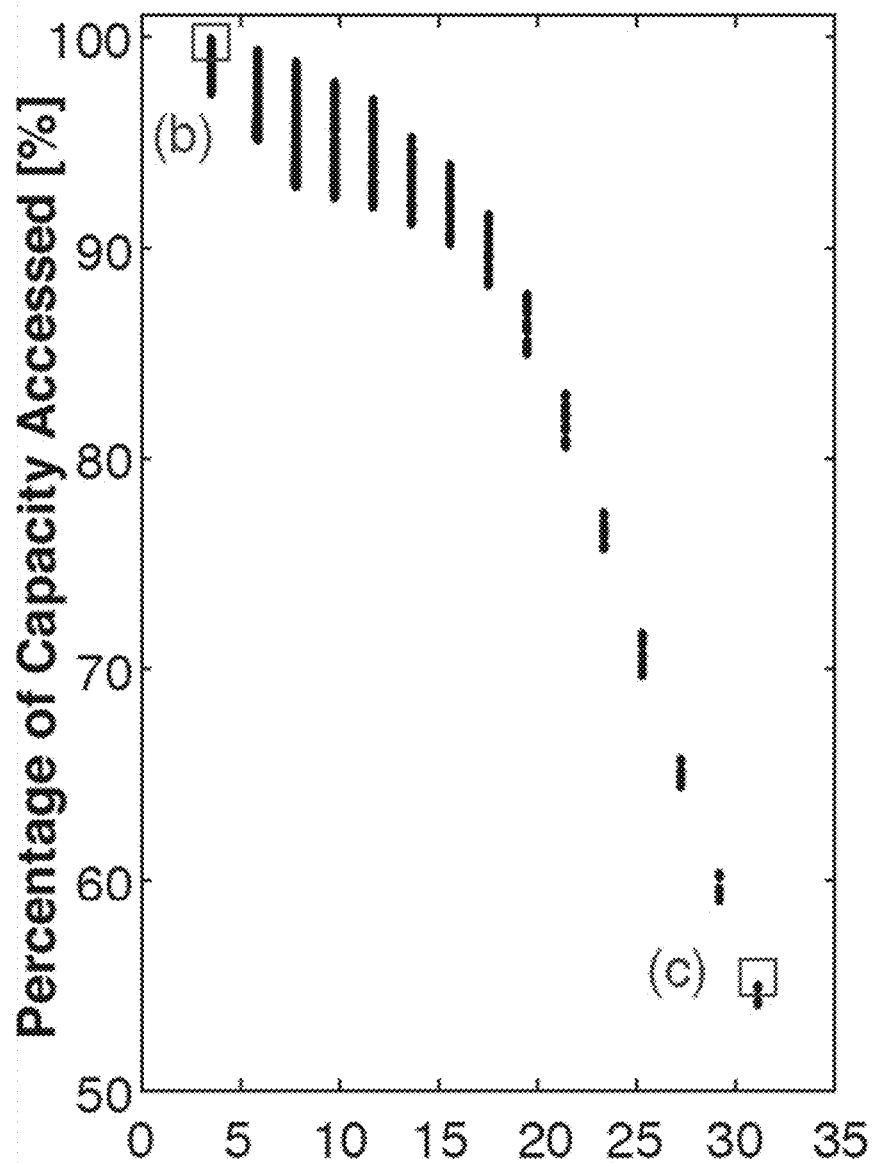
FIGS. 8A-8C shows percentage of capacity accessed during discharge for convection cells with v=0.01 m/s ($10^4$ μm/s), as a function of δ' values ranging from 3.89 to 31.2, corresponding to dimensional ohmic drops ranging from 0.1 V to 0.8 V, respectively where the figure contains 560 data sets with varying $I_{app}$, $t_+$, D, and $c_{initial}$, and the accessed capacity enhancement by 0.01 m/s of flow for data sets with $c_{initial}$=100 mol/m³ is shown in (b) for δ' =3.89 and (c) for δ'=31.2, according to some embodiments.
Figure 8B:
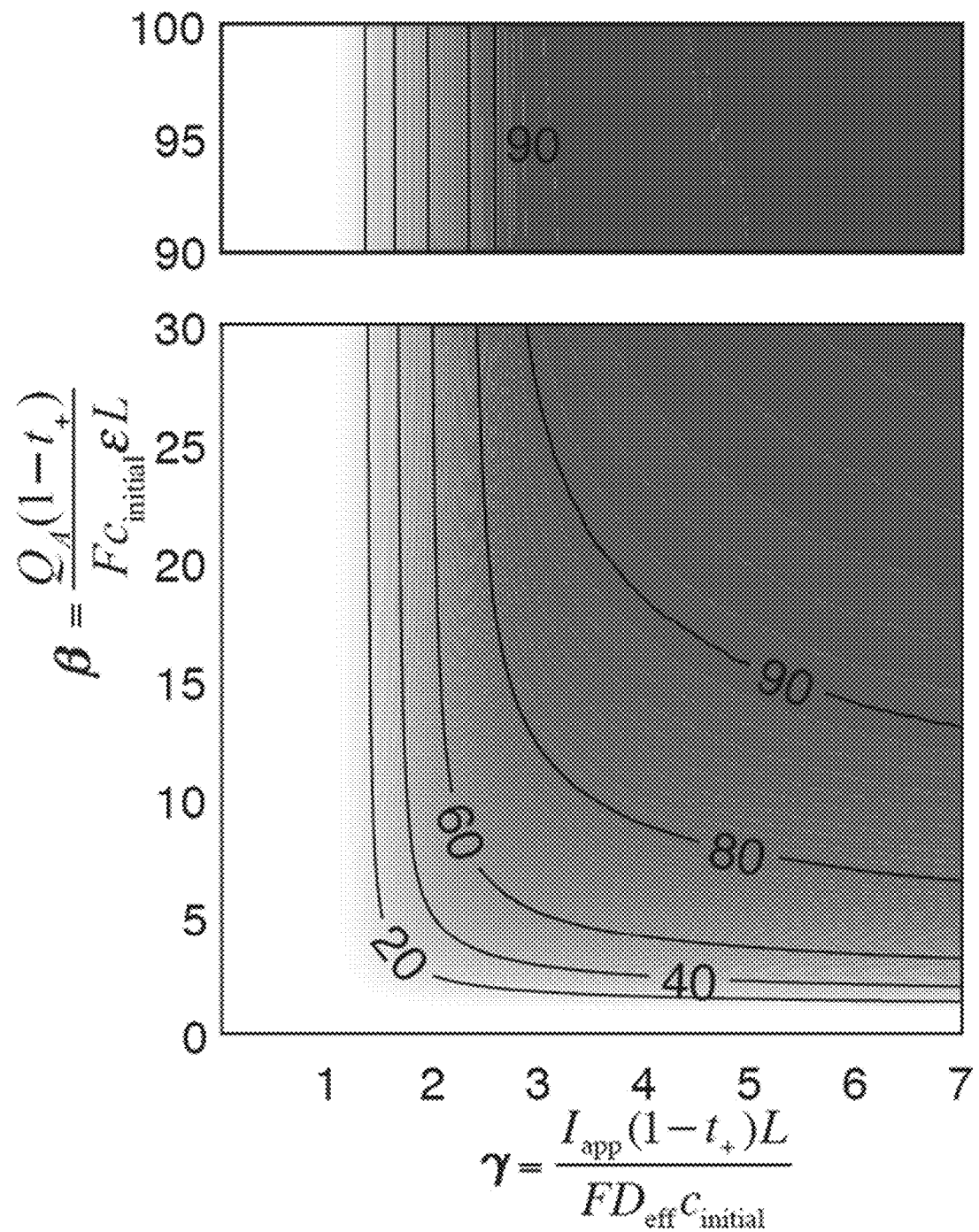
Figure 8C:
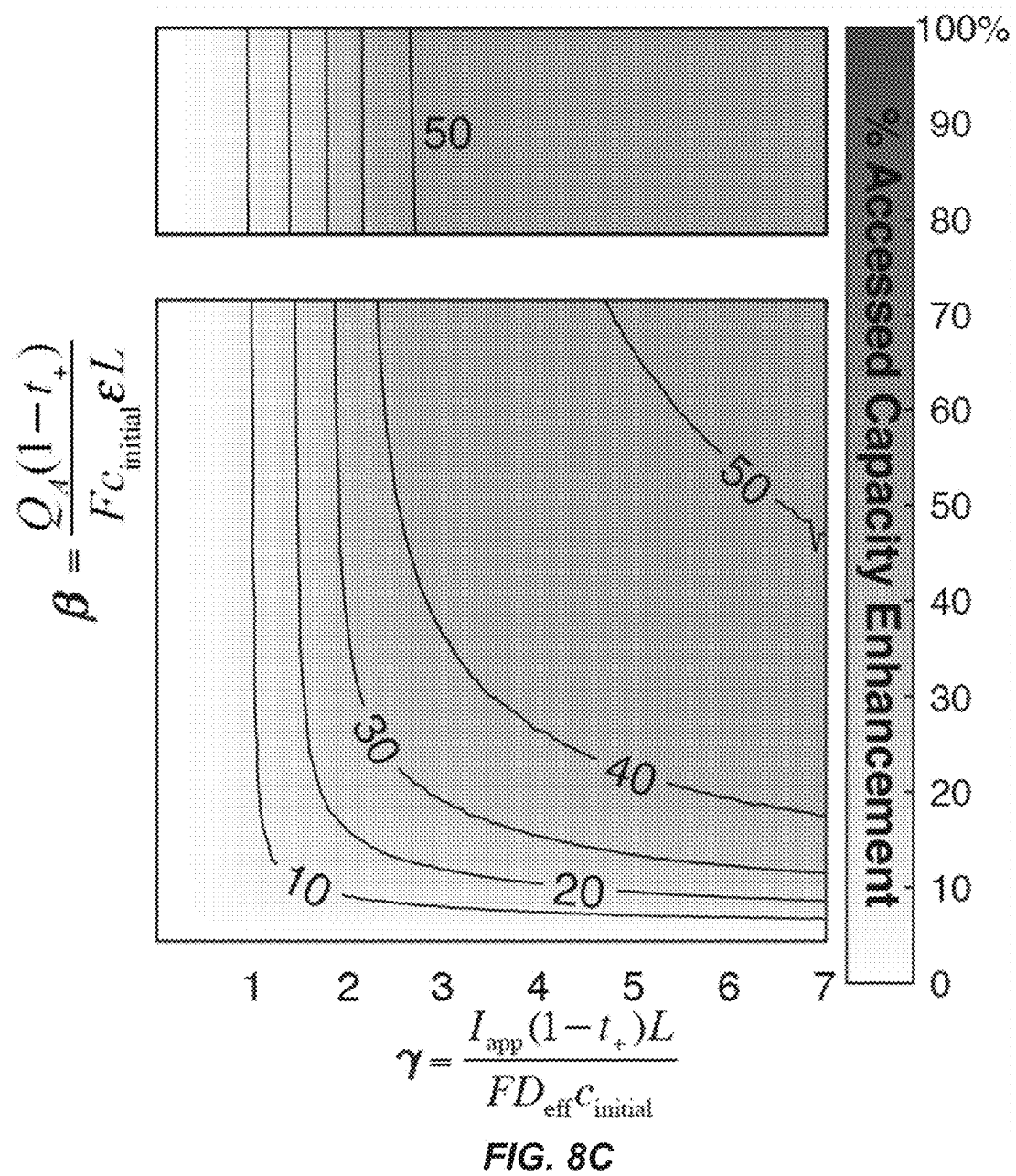

Lastly, LIONSIMBA+c can be used to understand the impact of improved transport on non-transport resistances within the cell, such as low electrolyte conductivity or sluggish kinetics. For this study, the impacts of ohmic losses were focused on, as shown in FIG. 8, but an analogous approach could be used to better understand the possible improvements in other areas of cell-design. With increasing ohmic resistance, the accessed capacity decreases monotonically from about 97% at $\delta'=3.89$ to ca. 54% at $\delta'=31.2$, despite including v=0.01 m/s electrolyte flow to eliminate any sources of mass-transfer losses. Again, some spread was seen in these data as individual simulations will have unique kinetic and solid-phase transport resistances, but the variance decreases with increasing $\delta'$ as fewer parameter combinations achieve the desired value. As previously discussed, by reducing the electrolyte salt concentration gradient, a convection cell offers opportunities for reduced concentration and activation overpotentials, and potentially improved electrolyte conductivity compared to a stagnant cell. FIG. 8B and FIG. 8C compare the accessed capacity enhancement by convection for cells with low ohmic resistance ($\delta'=3.89$) and high ohmic resistance ($\delta'=31.2$). Both figures demonstrated the same qualitative trends seen in FIG. 6 but differ in the upper limit for enhancement, as discussed above.

Conclusions

The avoidance of electrolyte mass transfer limits in intercalation-based battery chemistries would enable significant enhancements in accessible capacity and overall battery performance for a number of important applications. As such, the open-source LIONSIMBA model of enclosed Li-ion batteries was modified to incorporate electrolyte flow and, subsequently, simulated the impact of convection on isothermal cell performance over a broad range of conditions. For a cell operated under electrolyte transport limited conditions, such as high C-rate or low electrolyte diffusivity, electrolyte flow minimized concentration gradients across the cell thereby preventing electrolyte salt depletion that adversely affected kinetic, ohmic, and transport resistances and, if uncontrolled, could result in hazardous conditions within the battery. This, in turn, could enable an expanded operating envelope for intercalation batteries by increasing the accessible capacity but the effectiveness of this approach is dependent upon electrode properties, electrolyte composition, cell dimensions, and operating conditions. With the extension and description of physically meaningful dimensionless groups, over 10 physical parameters were collapsed and thousands of cell discharge simulation results into insightful comprehensive plots were analyzed. These plots quantitatively addressed the important questions of when convection is needed, how much is needed, and what is the upper bound of enhancement when convection is used. To summarize our key findings, convection is most helpful for a cell with large $\gamma$ and $\beta$ values, which has high transport resistance from diffusion and there is limited salt in the electrolyte solution to compensate. Practical conditions with large $\gamma$ and $\beta$ include high applied current density, low electrode porosity, low $Li^+$ transference number, and active materials with high specific capacity. The dimensionless group, $\xi$, represents the ratio of electromigrative flux to the sum of diffusion and convective fluxes, and can help determine whether flowrate is high enough to access full capacity. The group $\delta'$ can help determine ohmic resistance, which is one of the factors that can limit the maximum percentage of capacity that a convection cell can access if the resistance is large. If significant, kinetic and solid-phase transport effects may also limit convection cell performance, and their impacts can be analyzed using a similar approach as demonstrated in this work for ohmic resistance.

The above simulation example suggests that compared to an enclosed cell, a convection cell provides opportunities for a range of operating conditions and electrode design parameters. With the same or similar dimensionless plots presented here, a practitioner can readily calculate dimensionless group values for a cell and application of interest to estimate any benefit of flow. This approach could potentially lead to applications leveraging rate capability, such as fast charging, and enable high energy density by increasing electrode thickness. By eliminating electrolyte salt depletion, convection could improve cell safety under extreme conditions.

Example 2

The following example provides additional information regarding the modeling, simulations, design, and materials for fabrication of electrochemical cells that include convection of the electrolyte.

In FIG. 13, discharge curves at varying C-rates for the original LIONSIMBA and LIONSIMBA+c with v=0 m/s and compared. The identical outputs suggest no artifacts were introduced to the original model during the modifications.

Figure 14:
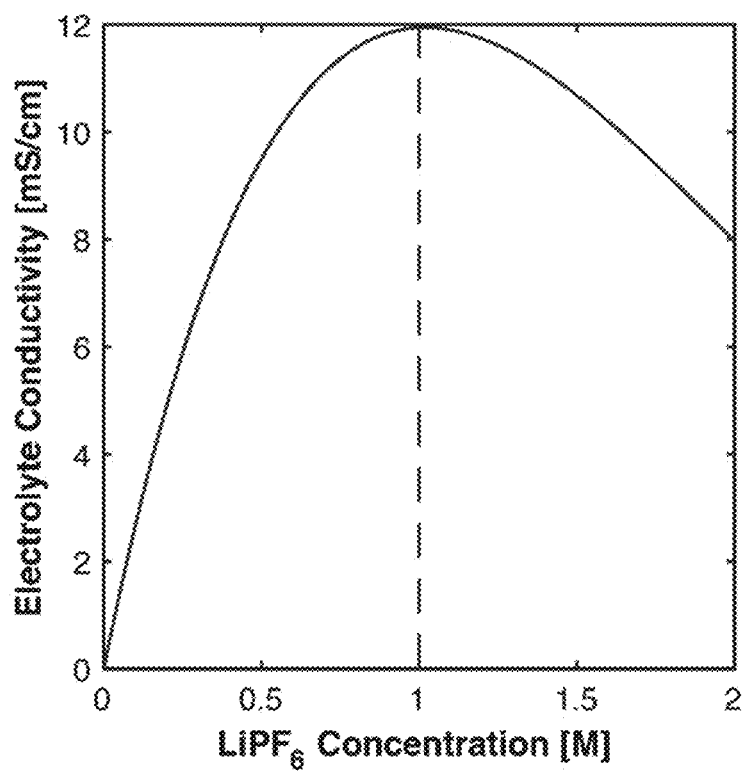
FIG. 14 shows an electrolyte's conductivity as a function of salt concentration at T=298.15 K used in the simulation with the conductivity maxima observed at 1 M, according to some embodiments.
Figure 15:
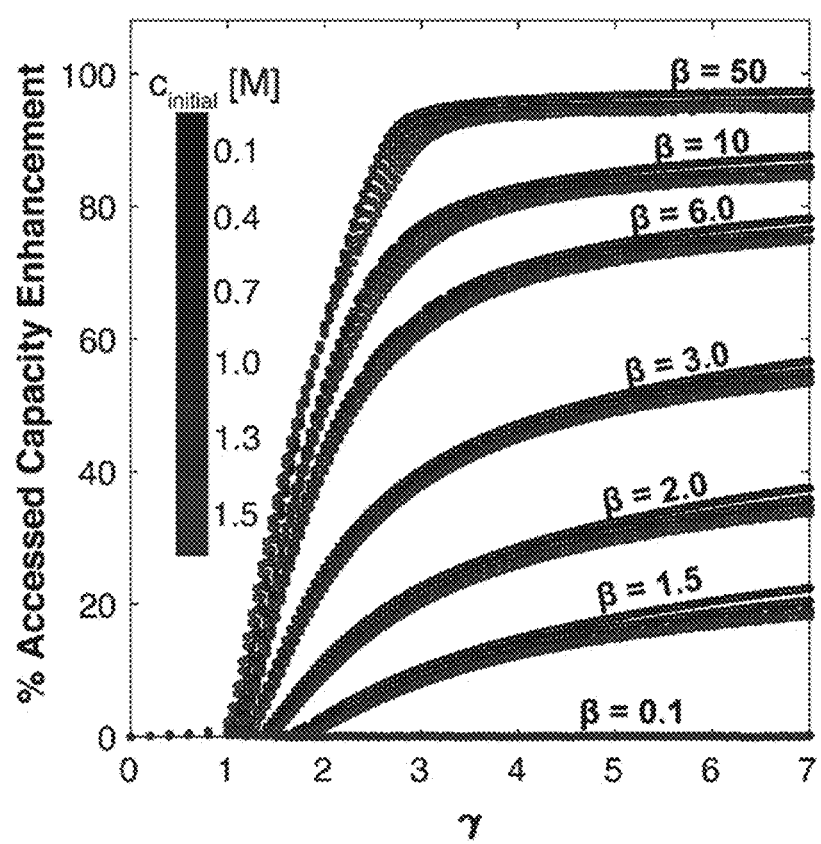
FIG. 15 shows the percentage of accessed capacity enhancement for selected β values with $c_{initial}$ from 0.1 M to 1.5 M, with δ'=3.89, according to some embodiments.

FIG. 14 shows the conductivity of the electrolyte, $LiPF_6$ in PC/EC/DMC, as a function of $LiPF_6$ concentration at T=298.15 K used in the simulation, where the curve was generated by least-square fits of experimental measurements to Eq. (1), $$\sqrt{\frac{\kappa(c,T)}{c}} = \sum_{i=0}^{n}\sum_{j=0}^{k} \kappa_{ij} c^i T^j,$$

and where the plot was a non-monotonic concave down curve, with maxima at 1 M electrolyte concentration where, by maintaining the electrolyte concentration closer to the initial concentration of 1 M, a convection cell can help reduce electrolyte-phase ohmic resistance, thus minimizing ohmic potential drop.

In FIG. 16, the enhancement, as a percentage, in accessed capacity by convection for selected $\beta$ values is shown, with initial concentration, $c_{initial}$, varying from 0.1 M to 1.5 M. All the conditions have a $\delta'$ value of 3.89. Different $c_{initial}$ values showed the same trend with slight variation in absolute values. Without wishing to be bound by any particular theory, this variation was believed to be a result of different kinetic and solid-phase diffusion resistances for different $c_{initial}$ and $I_{app}$ combinations.

Figure 17:
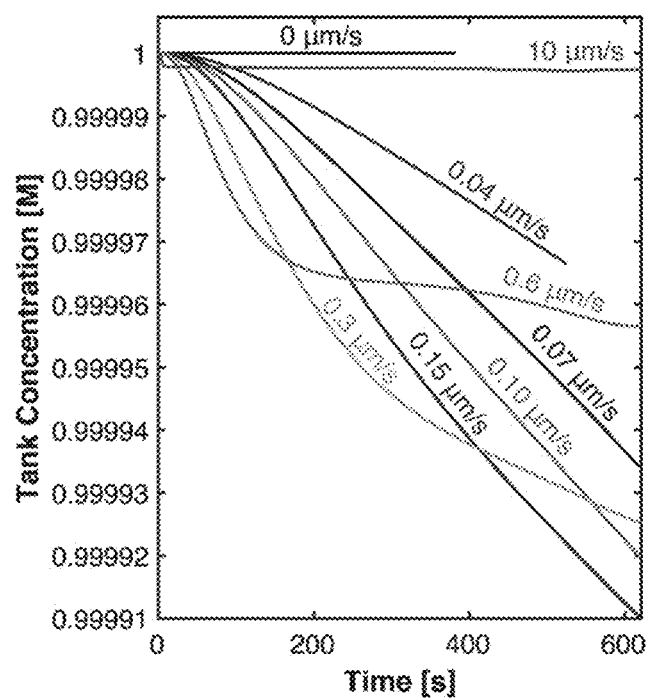
FIG. 17 show the corresponding electrolyte concentration change in the tank as a function of time for the same data described in FIG. E3, according to some embodiments.

FIG. 17 shows the percentage of capacity accessed as a function of $\xi$ for selected $\beta$ and $\gamma$ values, with $c_{initial}$=1.5 M and $\delta'$=3.89. The figure shows similar trends as in FIG. 7A in the main text, with the exception of the transitional region of $1<\xi<3$ that now demonstrates complex behavior as a result of the non-monotonic electrolyte conductivity change with concentration, as shown in FIG. 14. Specifically, there was a concentration buildup at intermediate flowrates. When $c_{initial}>1$ M, this concentration buildup lead to lower average electrolyte conductivity in the cell, thus larger ohmic drops and decreased accessed capacity.

It is noted that LIONSIMBA offered three choices of solid-phase diffusion model, including (1) a two-parameter polynomial approximation,2 (2) a higher-order polynomial approximation, and (3) Fick's law. The first two models are approximations of Fick's law without significant loss of accuracy. In this study, the higher-order polynomial approximation model was elected for all the simulations. This choice was based on the high discharge rates used, up to 10 C, for which the higher-order polynomial approximation demonstrated higher accuracy than the two-parameter polynomial approximation. It was also observed that the higher-order polynomial approximation showed better convergence for these applications. While the higher-order polynomial approximation was less accurate than the full Fick's law model at high C-rates (RMSE=1.9% at 10 C), it was found that this reduction in accuracy was acceptable for these applications, especially when the savings in computational time, about 60% at low C-rates and about. 40% at high C-rates, are considered.

The equations for the higher-order polynomial approximation are shown below. In the equations, $c_s^{avg}(x,t)$ is the solid-phase average concentration, $j(x,t)$ is the ionic flux, $R_p$ is the active material particle radius, $D_{eff}^s$ is the effective solid phase diffusivity, $q(x,t)$ is the volume-averaged concentration flux, and $c_s^*(x,t)$ is the solid-phase surface concentration.

$$\frac{\partial c_s^{avg}(x,t)}{\partial t} = -3\frac{j(x,t)}{R_p} \qquad (2\text{-}1)$$

$$\frac{\partial c_s^{avg}(x,t)}{\partial t} = -30\frac{D_{eff}^s}{R_p^2}q(x,t) - \frac{45}{2}\frac{j(x,t)}{R_p^2}$$

$$c_s^*(x,t) - c_s^{avg}(x,t) = -\frac{j(x,t)R_p}{35 D_{eff}^s} + 8R_p q(x,t)$$

Figure 18A:
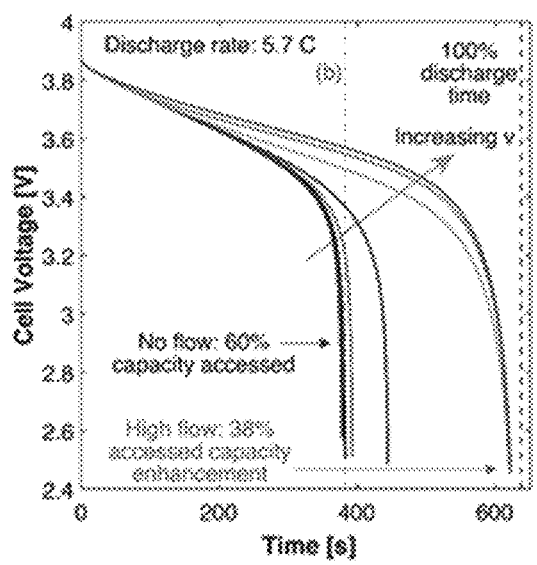
FIGS. 18A-18B shows a cell voltage curves and corresponding electrolyte concentration profiles for reverse flow direction compared to FIG. E3, according to some embodiments.
Figure 18B:
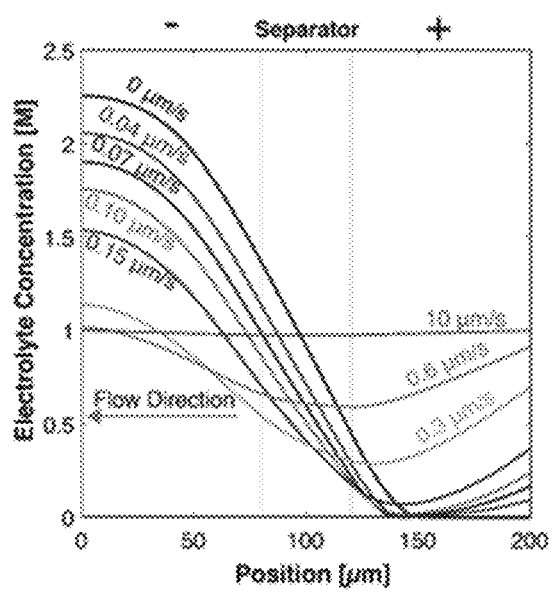

A close inspection of the concentration profiles in FIG. 5B leads to additional intriguing findings. Without flow, the amount of lithium-ion accumulation in the negative electrode equals the amount of Li+ depletion in the positive electrode, and the average concentration is the initial electrolyte concentration. However, this is not necessarily the case in a convection cell. During discharge of a convection cell with the flow direction in FIG. 5, the electrolyte exited the positive electrode to the tank, and entered from the tank to the negative electrode. When the electrolyte concentration exiting the cell was lower than that entering the cell, there was a net accumulation of electrolyte concentration in the cell, and a net depletion in the tank. The electrolyte concentrations in the cell and the tank average volumetrically to the initial electrolyte concentration. FIG. 5B demonstrated this feature in cells with superficial velocities between 0.04 and 0.6 μm/s. FIG. 18 showed the tank concentration change with time. Because of a high tank volume/cell area ratio used in our simulation, the change in tank concentration was insignificant. Though not explored in this publication, the ability to accumulate salt in the cell may have utility in further applications, such as enabling the use of a lower electrolyte concentration while still maintaining a relatively small ohmic resistance.

FIG. 18 shows the cell voltage curves and corresponding electrolyte concentration profiles with same conditions but reverse flow direction compared to the data of FIG. 5. The trends were similar to what was discussed for FIG. 5, except the impacts of flow on cell performance appeared to be less significant at low flow velocities as electrolyte salt depletion persists. At v=10 μm/s when the electrolyte concentration approached $c_{initial}$=1 M everywhere, both flow directions have the same effects on cell performance. These observations also agreed with previous literature findings. This suggested that flow should be in the direction from the Li+ generating electrode to the Li+ consuming electrode for maximal effectiveness at low flowrates.

It is noted that the pressure drop through the cell was estimated using Kozeny-Carman Equation:

$$\frac{\Delta p}{L} = v \frac{180\mu}{\Phi_s^2 D_p^2} \frac{(1-\varepsilon)^2}{\varepsilon^3} \quad (2\text{-}2)$$

where $\Delta p$ is the pressure drop, L is the cell total length, v is the superficial velocity, $\mu$ is the electrolyte viscosity, $\varepsilon$ is the porosity, and $\Phi_s$ is the sphericity of the particles with diameter $D_p$. The energy required for pumping flowrate Q through a cell with cross-sectional area A during discharge time $t_d$ is estimated with Eq. (2-3):

$$W_{pump} = Q\Delta p t_d = Av^2 \frac{180\mu}{\Phi_s^2 D_p^2} \frac{(1-\varepsilon)^2}{\varepsilon^3} L t_d \quad (2\text{-}3)$$

The cell used in FIG. 3 and in the cell described above has L=200 μm, ε=0.4, and the active materials are assumed to be spheres with $\Phi_s=1$ and $D_p=4\times10^{-6}$ m. Assuming the electrolyte has a viscosity of 10 cP, Table S1 shows energy gain for one cell, $E_{cell\_gain}$, and pumping loss for one cell, $E_{cell\_loss}$, per unit area of the cell with v=10 μm/s compared to the cell without flow.

Table S1. Energy gain and pumping loss by a convection cell with v=10 μm/s.

TABLE S1

Energy gain and pumping loss by a convection cell with v = 10 μm/s.

| | Discharge time [s] | Cell areal energy density [Wh/m²] | Required pumping energy for one cell [Wh/m²] |
|---|---|---|---|
| v = 0 μm/s | 382 | 57.6 | 0 |
| v = 10 μm/s | 622 | 92.9 | 0.0022 |
| | | $E_{cell\_gain} = 35.3$ | $E_{cell\_loss} = 0.0022$ |

Note that this calculation was performed for flow within a single cell. A thorough analysis of fluid dynamics throughout the cell stack, manifolding, pumping equipment, and tank would be needed to understand this trade-off at the system-level.

For a binary univalent electrolyte, $c_e=C_+=c_-$, $z_+=1$, $z_-=-1$. In a porous electrode, the superficial flux densities of anions and cations are given by Eq. (2-4) and (2-5), respectively, where $u_i$ is the effective ionic mobility, $D_i$ is the effective ionic diffusion coefficient, and $\Phi_2$ is the potential in the pore-filling electrolyte:

$$N_- = -D_-\nabla c_e + v c_e + u_- F c_e \nabla \Phi_2 \quad (2\text{-}4)$$

$$N_+ = -D_+\nabla c_e + v c_e - u_+ F c_e \nabla \Phi_2 \quad (2\text{-}5)$$

Eq. (2-6) gives the superficial current density $i_2$ in the pore phase for the binary electrolyte:

$$i_2 = F(N_+ - N_-) = -F(D_+ - D_-)\nabla c_e - F^2 \nabla \Phi_2 (u_+ c_e + u_- c_e) \quad (2\text{-}6)$$

Substituting Eq. (2-6) into Eq. (2-4) yields:

$$N_- = -D_{eff}\nabla c_e + v c_e - \frac{1-t_+}{F} i_2 \quad (2\text{-}7)$$

where the effective electrolyte diffusion coefficient $$D_{eff} = \frac{2D_+ D_-}{D_+ + D_-}$$

and the Li$^+$ transference number $$t_+ = \frac{u_+}{u_+ + u_-}.$$

Material balance on the anion species using Eq. (2-7) gives Eq. (2-8), which is the form used for Eq. (2-9) in the main text.

$$\varepsilon\frac{\partial c_e}{\partial t} = -\frac{\partial N_-}{\partial x} = \quad (9)$$

$$-\frac{\partial}{\partial x}\left(-D_{eff}\frac{\partial c_e}{\partial x} + v c_e - \frac{1-t_+}{F}i_2\right) = \frac{\partial}{\partial x}\left(D_{eff}\frac{\partial c_e}{\partial x}\right) - v\frac{\partial c_e}{\partial x} + \frac{1-t_+}{F}\frac{\partial i_2}{\partial x}$$

Only Li$^+$ species in the electrolyte undergoes reaction, and Faraday's law relates $i_2$ to j, the Li$^+$ ionic flux from the solid phases to the pore solution:

$$\frac{\partial i_2}{\partial x} = aFj \quad (2\text{-}9)$$

Combining Eq. (2-8) and (2-9) gives the governing equation in the form of Eq. (2-1) in the main text:

$$\varepsilon\frac{\partial c_e}{\partial t} = \frac{\partial}{\partial x}\left(D_{eff}\frac{\partial c_e}{\partial x}\right) - v\frac{\partial c_e}{\partial x} + a(1-t_+)j \quad (2\text{-}10)$$

The dimensionless groups in Table 10 in the context of fluxes, as this provided a straightforward comparison between the magnitude of different physical processes. Alternatively, the dimensionless groups can be derived using timescale analysis, an approach that is more commonly used in literature. To identify the relevant timescales, the non-dimensionalized equation Eq. (2-9) in the main text can be rewritten as:

$$\frac{1}{t_{dis}}\frac{\partial \tilde{c}_e}{\partial \tilde{t}} = -\frac{\partial}{\partial \tilde{x}}\left(-\frac{D_i}{L^2}\frac{\partial \tilde{c}_e}{\partial \tilde{x}} + \frac{v_{por,i}}{L}\tilde{c}_e - \frac{1-t_+}{Fc_{initial}\varepsilon_i L}I_{app}\tilde{i}_2\right) \quad (2\text{-}11)$$

Where $D_i$ is the ionic diffusivity in the electrode corrected only for the tortuosity, and relates to the effective diffusivity $D_{eff}$ by $D_{eff}=\varepsilon_i D_i$; $v_{por,i}$ is the solution phase velocity in the porous electrode, and relates to the superficial velocity v by $v=\varepsilon_i v_{por,i}$. The equation yields several time scales summarized in Table 2, which are also compared to their counterparts expressed in rates.

TABLE 2

Timescales and corresponding characteristic rates relevant to the electrolyte transport during convection battery operation.

| Phenomenon | Characteristic Timescale | Characteristic Rate (mol/time*cell area) | Meaning | Implication: End of discharge due to . . . |
|---|---|---|---|---|
| Discharge | $t_{dis} = \dfrac{Q_A}{I_{app}}$ | $\dfrac{I_{app}}{F}$ | Timescale to: deplete Li in solid at applied current use full theoretical capacity | Exhaustion of theoretical capacity if $t_{dis}$ small |
| Electrolyte Diffusion | $t_e = \dfrac{L^2}{D_i}$ | $\dfrac{D_{eff} c_{initial}}{L}$ | Timescale for diffusion: across electrode or separator, to revive cathode from Li$^+$ depletion | Diffusion unable to prevent Li$^+$ depletion if $t_e$ large |
| Convection | $t_v = \dfrac{L}{v_{por,i}}$ | $vc_{initial}$ | Flow residence timescale Timescale needed for convection to revive cathode from Li$^+$ depletion | Convection unable to prevent Li$^+$ depletion if $t_v$ large |
| Migration | $t_c = \dfrac{Fc_{initial}\varepsilon_i L}{(1-t_+)I_{app}}$ | $\dfrac{I_{app}(1-t_+)}{F}$ | Timescale of electrolyte Li$^+$ salt: depletion in cathode excess in anode | Li$^+$ salt depletion in cathode and excess in anode if tc small |

Similar forms of diffusion and migration timescales have also been defined in prior literature. Using these timescales, the dimensionless groups in Table E2 can be derived as shown in Table 16.

TABLE 2

Derivation of the dimensionless groups using timescales defined in Table 1.

| Dimensionless group | Definition | Expression |
|---|---|---|
| γ | $\dfrac{t_e}{t_c}$ | $\dfrac{I_{app}(1-t_+)L}{FD_{eff}c_{initial}}$ |
| ξ | $\dfrac{1}{\dfrac{1}{t_e}+\dfrac{1}{t_v}}\Big/ t_c$ | $\dfrac{I_{app}(1-t_+)}{\dfrac{FD_{eff}c_{initial}}{L}+Fvc_{initial}} = \dfrac{\gamma}{1+Pe}$ |
| Pe | $\dfrac{t_e}{t_v}$ | $\dfrac{Lv}{D_{eff}}$ |
| β | $\dfrac{t_{dis}}{t_c}$ | $\dfrac{I_{app}t_{dis}(1-t_+)}{Fc_{initial}\varepsilon L} = \dfrac{Q_A(1-t_+)}{Fc_{initial}\varepsilon L}$ |

As described above, the dimensionless groups in the table are derived in the context of fluxes, as this provided a straightforward comparison between the magnitude of different physical processes. Alternatively, the dimensionless groups can be derived using timescale analysis, an approach that is more commonly used in literature. To identify the relevant timescales, the non-dimensionalized equation Eq. (2-9) above:

$$\frac{1}{t_{dis}}\frac{\partial \tilde{c}_e}{\partial \tilde{t}} = -\frac{\partial}{\partial \tilde{x}}\left(-\frac{D_i}{L^2}\frac{\partial \tilde{c}_e}{\partial \tilde{x}} + \frac{v_{por,i}}{L}\tilde{c}_e - \frac{1-t_+}{Fc_{initial}\varepsilon_i L}I_{app}\tilde{i}_2\right) \quad (2-11)$$

Where $D_i$ is the ionic diffusivity in the electrode corrected only for the tortuosity, and relates to the effective diffusivity $D_{eff}$ by $D_{eff}=\varepsilon_i D_i$; $v_{por,i}$ was the solution phase velocity in the porous electrode, and relates to the superficial velocity v by $v=\varepsilon_i v_{por,i}$. The equation yields several time scales summarized in the table, which was also compared to their counterparts expressed in rates.

Effect of Solid-Phase Transport

The effect of solid-phase diffusion can be evaluated using the solid diffusion timescale ($t_s$) derived in Eq. (2-12). A similar expression has also been reported by Jiang et al. In this study, the particle radius $R_p$ and solid-phase diffusivity $D^s$ are constants, hence the solid-phase diffusion timescale in the positive electrode has a constant value of 133.3 s.

$$t_s = \frac{\text{amount of Li}^+ \text{ in solid}}{\text{solid diffusion rate}} = \frac{c_s^* \times \left(\frac{4}{3}\pi R_p^3\right)}{\left(\dfrac{D^s c_s^*}{R_p}\right)\times(4\pi R_p^2)} = \frac{R_p^2}{3D^s} \quad (2-12)$$

Comparison with the timescales defined in the table can help estimate the magnitude of solid-phase diffusion resistance. Firstly, the discharge timescale ($t_{dis}$) used in this study ranges from 320 s to over 2000 s, which is significantly larger than $t_s$, suggesting fast solid-phase diffusion during the discharge process. Secondly, for cases that suffer significantly from electrolyte transport resistance (large γ and β), the electrolyte diffusion timescale ($t_e$) is in general very large relatively. For example, the condition used in FIG. 5 has $t_e$ of 256 s, and the solid-phase transport resistance is not a major limitation in comparison.

Effect of Kinetics

A dimensional kinetics potential drop ($V_{kinetics}$) was defined in Eq. (2-15), which was derived from $v^2$ defined by Newman and co-workers, and δ' defined in this work.

$$V_{kinetics} = \frac{RTI_{app}}{F^2 aLk\sqrt{c_{initial}(c_s^{max} - c_{s,initial}^*)c_{s,initial}^*}} \quad (10)$$

For the conditions used in FIG. 5, $V_{kinetics}$ is 0.031 V and 0.027 V in positive and negative electrodes, respectively, which are both small compared to the dimensional ohmic drop of 0.1 V. This holds true for all the sets of conditions used in this study.

Example 3

Figure 7A:
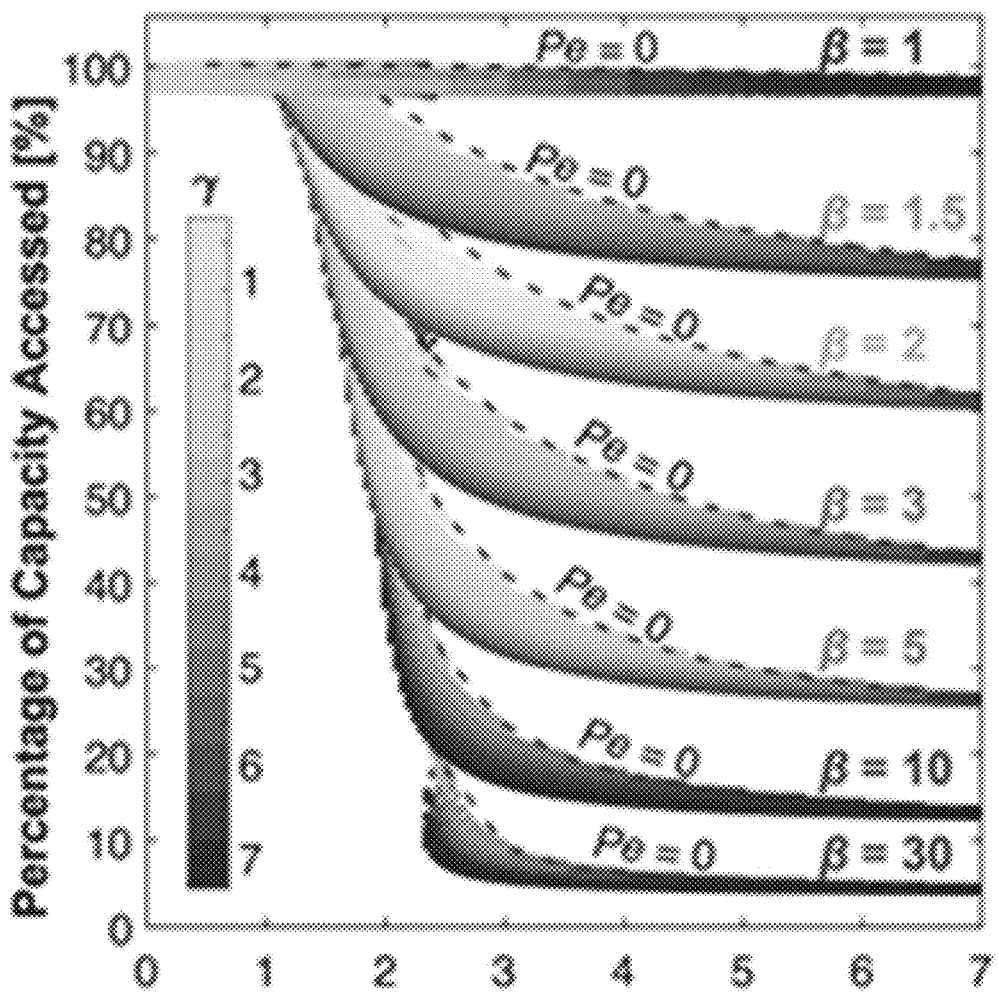
FIG. 7A show the percentage of capacity accessed for convection cells with varying ξ values. The plot contains 29792 data sets with varying $I_{app}$, $t_+$, D, $c_{initial}$, v, and a constant δ' value of 3.89 (0.1 V dimensional ohmic drop) where results for $c_{initial}$>1000 mol/m³ are not included in the plot as they lead to slightly different behaviors at intermediate ξ values shown in FIG. 17, according to some embodiments.
Figure 7B:
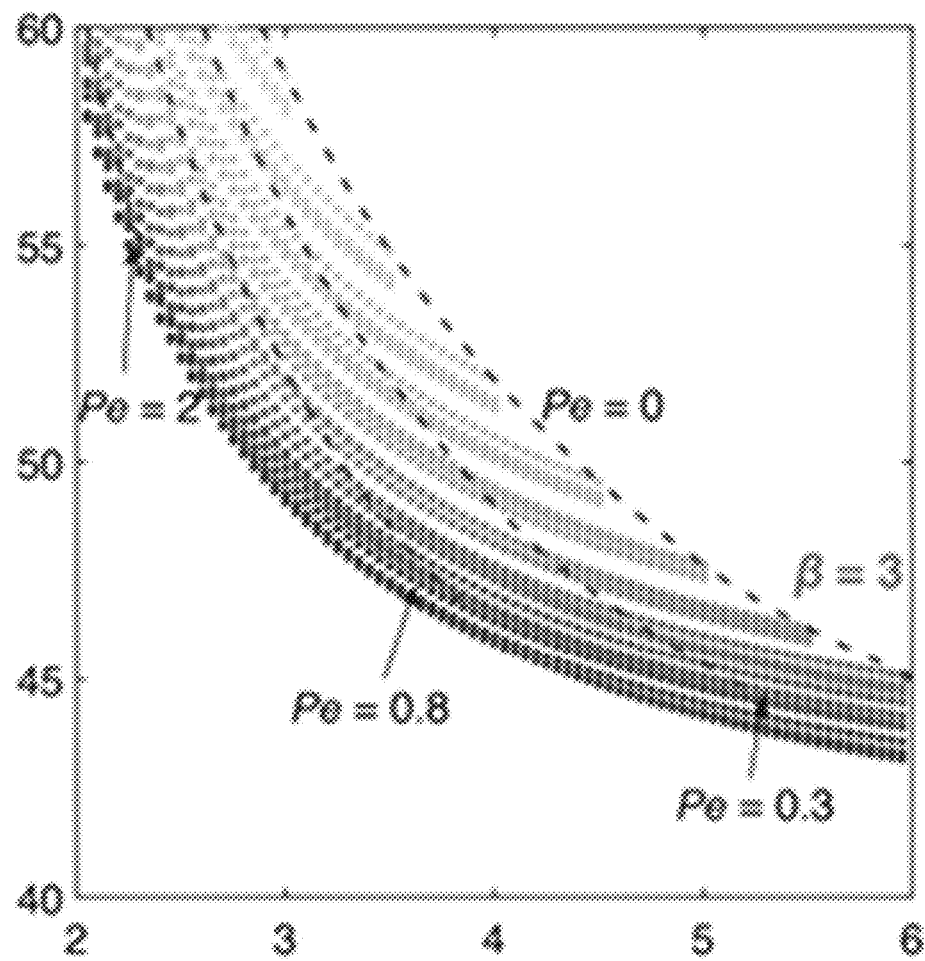
FIG. 7B shows an enlarged view of data for β=3 and contours of Pe values where, for a particular γ value, the percentage of capacity accessed increases with increasing Pe, according to some embodiments.

The following example uses γ, β, and ξ from FIG. 7A to show the improvement a cell performance an electrochemical cell could receive with convection relative to a cell without convection with all other relevant factors being essentially equal. The dimensional ohmic potential drop is 0.1 V.

A cell has $LiCoO_2$ as the positive electrode active material and graphite as the negative electrode active material. The electrodes are 80 μm thick with a porosity of 0.4; the separator is 40 μm thick with a porosity of 0.4; the electrolyte has a transference number ($t_+$) of 0.325, a diffusivity ($D_i$) of $3.7 \times 10^{-10}$ m²/s, and an initial concentration ($c_{initial}$) of 700 mol/m³; and the cell is discharged at a current density of 140 A/m² (5.3C). The cell has a γ value of 3, and a β value of 30, and can access 9% of its theoretical capacity without convection. By introducing convection with flowing electrolyte superficial velocities of 0.17 μm/s and 2.33 μm/s, the ξ value becomes 2.2 and 0.5 respectively, and the cell can access 67% and 98% of its theoretical capacity, respectively.

Example 4

This example uses γ, β, and ξ from FIG. 7A to show the improvement of cell performance with convection relative to a cell without convection with all other relevant factors being essentially equal. The dimensional ohmic potential drop is 0.1 V.

A cell has $LiCoO_2$ as the positive electrode active material and graphite as the negative electrode active material. The electrodes are 80 μm thick with a porosity of 0.4; the separator is 40 μm thick with a porosity of 0.4; the electrolyte has a transference number ($t_+$) of 0.84, a diffusivity ($D_i$) of $4.4 \times 10^{-11}$ m²/s, and an initial concentration ($c_{initial}$) of 1000 mol/m³; and the cell is discharged at a current density of 151 A/m² (5.6C). The cell has a γ value of 4.5 and a β value of 5 and can access 32% of its theoretical capacity without convection. By introducing convection with flowing electrolyte superficial velocities of 0.08 μm/s and 0.22 μm/s, the ξ value becomes 1.8 and 0.9, and the cell can access 61% and 97% of its theoretical capacity, respectively.

Example 5

This example uses γ, β, and ξ to show the improvement of cell performance with convection relative to a cell without convection with all other relevant factors being essentially equal. The dimensional ohmic potential drop is 0.1 V.

A cell has $LiCoO_2$ as the positive electrode active material and graphite in the negative electrode. The electrodes are 80 μm thick with a porosity of 0.4; the separator is 40 μm thick with a porosity of 0.4; the electrolyte has a transference number ($t_+$) of 0.90, a diffusivity ($D_i$) of $5.9 \times 10^{-11}$ m²/s, and an initial concentration ($c_{initial}$) of 100 mol/m³; and the cell is discharged at a current density of 34 A/m² (1.3C). The cell has a γ value of 4.5, and a β value of 30, and can access 6% of its theoretical capacity without convection. By introducing convection with a flowing electrolyte superficial velocity of 0.28 μm/s, the ξ value becomes 0.95, and the cell can access 99% of its theoretical capacity.

Example 6

This example shows the improvement in cell performance with convection when the cell has a large ohmic resistance from FIG. 8C with all other relevant factors being essentially equal.

A cell with $LiCoO_2$ as the positive electrode active material and graphite in the negative electrode. The electrodes are 80 μm thick with a porosity of 0.4; the separator is 40 μm thick with a porosity of 0.4; the electrolyte has a transference number ($t_+$) of 0.72, a diffusivity ($D_i$) of $9.2 \times 10^{-10}$ m²/s, and an initial concentration ($c_{initial}$) of 100 mol/m³; and the cell is discharged at a current density of 270 A/m² (10C). The cell has a γ value of 6.7, and a β value of 87; the cell also has a dimensional ohmic potential drop value of 0.8 V. Without flow, 1% of the theoretical capacity can be accessed; by introducing electrolyte flow to the cell, up to 55% of the theoretical capacity can be accessed.

Example 7

The following example provides cell dimensions, material properties, and operation parameters for an improvement in performance of a Li-ion cell with convection in compared to the cell with no convection with all other relevant factors being essentially equal.

The cell with no convection has positive electrode thickness, L, of 154 microns, negative electrode thickness of 182 microns, and separator of 25 microns thickness. Positive electrode active material, negative electrode active material, and the separator are nickel manganese cobalt oxide, synthetic graphite, and Celgard 2325, respectively. Porosities for the positive and negative electrodes are 0.36 and 0.38. The electrolyte has a diffusivity, $D_i$, of $1.6 \times 10^{-10}$ m²/s, a Li⁺ transference number, $t_+$, of 0.46, and an initial Li⁺ salt concentration of 1 M. The discharge rate is 130 A/m² or 2C. The potential drop excluding electrolyte transport limitations is 0.4. With no convection, the resultant delivered capacity is approximately 5 Ah/m², which represents less than 10% of the theoretical capacity.

A comparison cell with convection is physically modeled. For the combination of dimension, properties, and operational current density, the value of β is approximately 22, and the value of γ is approximately 3. By introducing flow with a superficial velocity of 5.3 μm/s and all other parameters unchanged, the value of ξ becomes 0.5, and the capacity is estimated to improve to approximately 90% of the theoretical capacity with a potential drop of 0.4 V due to remaining limitations, such as ohmic, charge transfer kinetics, and solid diffusion resistances. This demonstrated that existing systems without convection could be remarkably improved by adding convection.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for determining upper and/or lower limits of convection in a flow cell battery, the method comprising:
    circulating a single electrolyte comprising an electroactive species in an electrochemical cell comprising a positive electrode, a separator, a negative electrode, wherein the electromigrative flux of the electroactive species is greater than the sum of the diffusive flux of the electroactive species and the convective flux of the electrolyte;
    applying a voltage between the positive electrode and the negative electrode to generate an electromigrative flux of the electroactive species; and
    circulating the single electrolyte in the electrochemical cell, wherein the electromigrative flux of the electroactive species is less than a sum of the diffusive flux of the electroactive species and the convective flux of the electrolyte.

2. A method for determining upper and/or lower limits of convection in a flow cell battery, the method comprising:
    circulating a single electrolyte in an electrochemical cell comprising a positive electrode, a separator, a negative electrode, wherein the electromigrative flux of the electroactive species is greater than the sum of the diffusive flux of the electroactive species and the convective flux of the electrolyte; and
    applying a voltage between the positive electrode and the negative electrode to generate an electromigrative flux of an electroactive species; and circulating the single electrolyte in the electrochemical cell, wherein a ratio of an applied current density to an effective diffusivity is greater than 1 and wherein a ratio of a convective flowrate to an initial electrolyte concentration is greater than 1.

3. The method of claim 2, wherein:

$$\frac{I_{app}(1-t_+)L}{FD_{eff}c_{initial}} > 0.5 \text{ and } \frac{Q_A(1-t_+)}{Fc_{initial}\varepsilon L} > 0.5,$$

where $I_{app}$ defines an applied current density, $t_+$ defines a transference number of the electroactive species of the electrolyte, L defines a dimension of the electrochemical cell or electrode, $D_{eff}$ defines an effective diffusivity of the electrolyte, $c_{initial}$ defines the initial concentration of the electrolyte, $Q_A$ defines an areal capacity of the electrochemical cell or electrode, and $\varepsilon$ defines an electrode porosity.

4. The method of claim 2, wherein:
the electrochemical cell satisfies $$\frac{I_{app}(1-t_+)L}{FD_{eff}c_{initial} + Fvc_{initial}L} < 3,$$

where $I_{app}$ defines an applied current density, $t_+$ defines a transference number of the electroactive species of the electrolyte, L defines a dimension of the electrochemical cell or electrode, $D_{eff}$ defines an effective diffusivity of the electrolyte, $c_{initial}$ defines the initial concentration of the electrolyte, and v defines the flow velocity.

5. The method of claim 1, wherein circulating comprises flowing the single electrolyte with an average velocity of greater than or equal to 0.001 μm/s and/or less than or equal to 10,000 μm/s.

6. The method of claim 1, wherein a thickness of the positive electrode is greater than or equal to 5 μm and/or less than or equal to 5 cm.

7. The method of claim 1, wherein a thickness of the negative electrode is less than or equal to 5 μm and/or less than or equal to 5 cm.

8. The method of claim 1, wherein the single electrolyte has an effective diffusivity of greater than or equal to 1×10⁻¹⁰ cm²/s and/or less than or equal to 1×10⁻¹ cm²/s.

9. The method of claim 1, wherein the electrolyte has an initial electrolyte concentration of greater than or equal to 10 mM and/or less than or equal to 5 M.

10. The method of claim 1, wherein a porosity of the positive electrode and/or the negative electrode is greater than or equal to 20% and less than or equal to 70%.

11. The method of claim 1, wherein the electromigrative flux of the electroactive species is less than three times a sum of the diffusive flux of the electroactive species and the convective flux of the electrolyte.

12. The method of claim 1, further comprising charging and/or discharging at a C-rate of greater than or equal to 0.001 h⁻¹ and less than or equal 1,000 h⁻¹.

13. The method of claim 1, wherein the electrochemical cell is part of a system comprising:
the positive electrode comprising a lithium intercalation compound;
the separator adjacent to the positive electrode;
the negative electrode adjacent to the separator, the negative electrode comprising lithium-intercalated graphite or lithium metal;
a tank holding a single electrolyte;
a pump connected to the tank to circulate the single electrolyte; and
a processor operatively associated with the system, wherein the processor is configured to circulate and circulate the single electrolyte,
wherein the pump is configured to provide an average flow rate to the electrolyte of greater than or equal to 0.001 μm/s.

14. The method of claim 13, wherein the pump is configured to provide an average flow rate to the electrolyte of greater than or equal to 0.5 μm/s or greater than or equal to 2.1 μm/s.

15. The method of claim 13, wherein the positive electrode comprises a nickel-manganese-cobalt oxide compound.

16. The method of claim 13, wherein the negative electrode comprises graphite.

17. The method of claim 13, wherein the separator comprises polyvinylidene difluoride.

18. The method of claim 13, further comprising a current collector adjacent to the positive electrode and/or the negative electrode.

19. The method of claim 13, wherein the single electrolyte comprises lithium hexafluorophosphate.

20. The method of claim 13, wherein the single electrolyte comprises ethylene carbonate, ethyl methyl carbonate, and/or vinylene carbonate.

21. The method of claim 1, further comprising a processor operatively associated with the electrochemical cell, wherein the processor is configured to circulate and/or recirculate the single electrolyte.

* * * * *